United States Patent
Yoon et al.

(10) Patent No.: US 11,125,610 B2
(45) Date of Patent: Sep. 21, 2021

(54) ELECTRONIC DEVICE AND METHOD FOR CONTROLLING AN AMBIENT LIGHT SENSOR, BASED ON A SIGNAL INDICATING AN OPERATION OF A DISPLAY

(71) Applicant: Samsung Electronics Co., Ltd, Suwon-si (KR)

(72) Inventors: Hee Woong Yoon, Seoul (KR); Jeong-Ho Cho, Hwaseong-si (KR); Jongah Kim, Suwon-si (KR); Donghan Lee, Suwon-si (KR); Song Hee Jung, Suwon-si (KR); Taeho Kim, Cheongju-si (KR); Jeong-Min Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 15/994,794

(22) Filed: May 31, 2018

(65) Prior Publication Data
US 2018/0348049 A1 Dec. 6, 2018

(30) Foreign Application Priority Data
Jun. 1, 2017 (KR) .......................... 10-2017-0068473

(51) Int. Cl.
*G01J 1/42* (2006.01)
*G09G 3/3208* (2016.01)
(Continued)

(52) U.S. Cl.
CPC .......... *G01J 1/4204* (2013.01); *G09G 3/3208* (2013.01); *G09G 3/3406* (2013.01);
(Continued)

(58) Field of Classification Search
CPC ............ G01J 1/4204; G01J 2001/4247; G01J 1/0233; G09G 3/3208; G09G 3/36;
(Continued)

(56) References Cited

U.S. PATENT DOCUMENTS 9,500,521 B2   11/2016   Kim et al.
2007/0126697 A1   6/2007   Sato et al.
(Continued)

FOREIGN PATENT DOCUMENTS

JP   2007179000 A   7/2007
JP   2016142770 A   8/2016
(Continued)

OTHER PUBLICATIONS

Notice of Patent Grant dated Apr. 30, 2021 in connection with Korean Patent Application No. 10-2017-0068473, 4 pages.

*Primary Examiner* — David D Davis

(57) ABSTRACT

The present disclosure includes an electronic device and a method thereof. The electronic device includes a display, an ambient light sensor, and at least one processor, operatively connected to the display and the ambient light sensor. The at least one processor is configured to detect, by using the ambient light sensor, ambient light of the electronic device during a first duration in a state in which the display is turned off, identify a setting for being used for the ambient light sensor, based at least in part on a characteristic of the ambient light, detect, by using the ambient light sensor, ambient light of the electronic device during a second duration based at least in part on the identified setting, and
(Continued)

control a function of the display, based at least in part on the characteristic of the ambient light detected during the second duration.

19 Claims, 20 Drawing Sheets

(51) Int. Cl.
    *G09G 3/36*     (2006.01)
    *G09G 3/34*     (2006.01)

(52) U.S. Cl.
    CPC ........ *G09G 3/36* (2013.01); *G01J 2001/4247* (2013.01); *G09G 2320/0295* (2013.01); *G09G 2320/0626* (2013.01); *G09G 2320/08* (2013.01); *G09G 2360/144* (2013.01)

(58) Field of Classification Search
    CPC ......... G09G 3/3406; G09G 2320/0626; G09G 2320/08; G09G 2320/0295; G09G 2360/144; H04M 1/72454; H04M 2250/12; H04M 2201/34; H04M 2201/38
    See application file for complete search history.

(56) References Cited

U.S. PATENT DOCUMENTS

| | | | |
|---|---|---|---|
| 2010/0201709 A1* | 8/2010 | Yang | H04N 21/44008 345/629 |
| 2011/0080421 A1* | 4/2011 | Capener | G09G 5/10 345/589 |
| 2013/0231161 A1* | 9/2013 | Hsu | G09G 3/3648 455/566 |
| 2014/0132158 A1* | 5/2014 | Land | G09G 3/20 315/152 |
| 2014/0166850 A1* | 6/2014 | Zheng | G09G 3/3406 250/205 |
| 2015/0070337 A1* | 3/2015 | Bell | G09G 3/2003 345/207 |
| 2015/0144934 A1 | 5/2015 | Rappoport et al. | |
| 2017/0221450 A1 | 8/2017 | Kim et al. | |
| 2019/0080668 A1* | 3/2019 | Holenarsipur | G01J 1/0437 |
| 2019/0154801 A1* | 5/2019 | Gani | G01S 7/4808 |

FOREIGN PATENT DOCUMENTS

| | | |
|---|---|---|
| KR | 10-2015-0028143 A | 3/2015 |
| KR | 10-2017-0090951 A | 8/2017 |

* cited by examiner

ELECTRONIC DEVICE AND METHOD FOR CONTROLLING AN AMBIENT LIGHT SENSOR, BASED ON A SIGNAL INDICATING AN OPERATION OF A DISPLAY

CROSS-REFERENCE TO RELATED APPLICATION(S)

This application is based on and claims priority under 35 U.S.C. § 119 to Korean Patent Application No. 10-2017-0068473 filed on Jun. 1, 2017 in the Korean Intellectual Property Office, the disclosure of which is incorporated herein by reference in its entirety.

BACKGROUND

1. Field

Various embodiments relate to an electronic device and method for controlling an ambient light sensor.

2. Description of Related Art

With the growth of technologies, an electronic device performing various functions is being developed. The electronic device may perform various functions through several sensors. For example, the electronic device can measure an illuminance of an environment where the electronic device is located, by means of an ambient light sensor.

The above information is presented as background information only to assist with an understanding of the present disclosure. No determination has been made, and no assertion is made, as to whether any of the above might be applicable as prior art with regard to the present disclosure.

SUMMARY

An ambient light sensor of an electronic device may be used to measure an illuminance of an environment where the electronic device is located.

Meantime, the electronic device may include a display. This display may provide light so as to provide information. The light provided by the display may affect measuring the illuminance of the environment where the electronic device is located.

Various embodiments may provide an electronic device and method for controlling an ambient light sensor, based on an environment where the electronic device is located and an operation mode of a display.

Various embodiments may provide an electronic device and method for controlling an operation of an ambient light sensor, based on a signal indicating an operation of a display.

An electronic device, according to various embodiments, may include a display, an ambient light sensor disposed in at least a partial region of the display or beneath the display, and at least one processor. The at least one processor may be operatively connected to the display and the ambient light sensor, and configured to detect ambient light of the electronic device during a first duration by using the ambient light sensor. The at least one processor may be further configured to, in a state in which the display is turned off, identify a setting to be used for the ambient light sensor, based at least in part on a characteristic of the ambient light. The at least one processor may be further configured to detect ambient light of the electronic device during a second duration through the ambient light sensor, based at least in part on the identified setting. The at least one processor may be further configured to control a function of the display, based at least in part on a characteristic of the ambient light detected during the second duration.

An electronic device, according to various embodiments, may include a display, an ambient light sensor comprising at least one light receiving unit for sensing ambient light of the electronic device, and at least one processor. The at least one processor may be operatively connected to the display and the ambient light sensor, and configured to activate the light receiving unit of the ambient light sensor during a first duration of time. The at least one processor may be further configured to detect ambient light of the electronic device. In response to a characteristic of the ambient light satisfying a designated condition, the at least one processor may activate the light receiving unit during a part of a second duration of time and inactivate the light receiving unit during another part of the second duration of time. The at least one processor may activate/inactivate the light receiving unit to detect ambient light of the electronic device and control a function of the display, based at least in part on a characteristic of the ambient light detected during the second duration of time.

A method of an electronic device according to various embodiments may include sensing ambient light of the electronic device during a first duration by using an ambient light sensor, in a state in which a display is turned off. The method may also include identifying a setting to be used for the ambient light sensor, based at least in part on a characteristic of the ambient light. The method may also include sensing ambient light of the electronic device during a second duration through the ambient light sensor, based at least in part on the identified setting, and controlling a function of the display, based at least in part on a characteristic of the ambient light detected during the second duration.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE EMBODIMENTS

Figure 1:
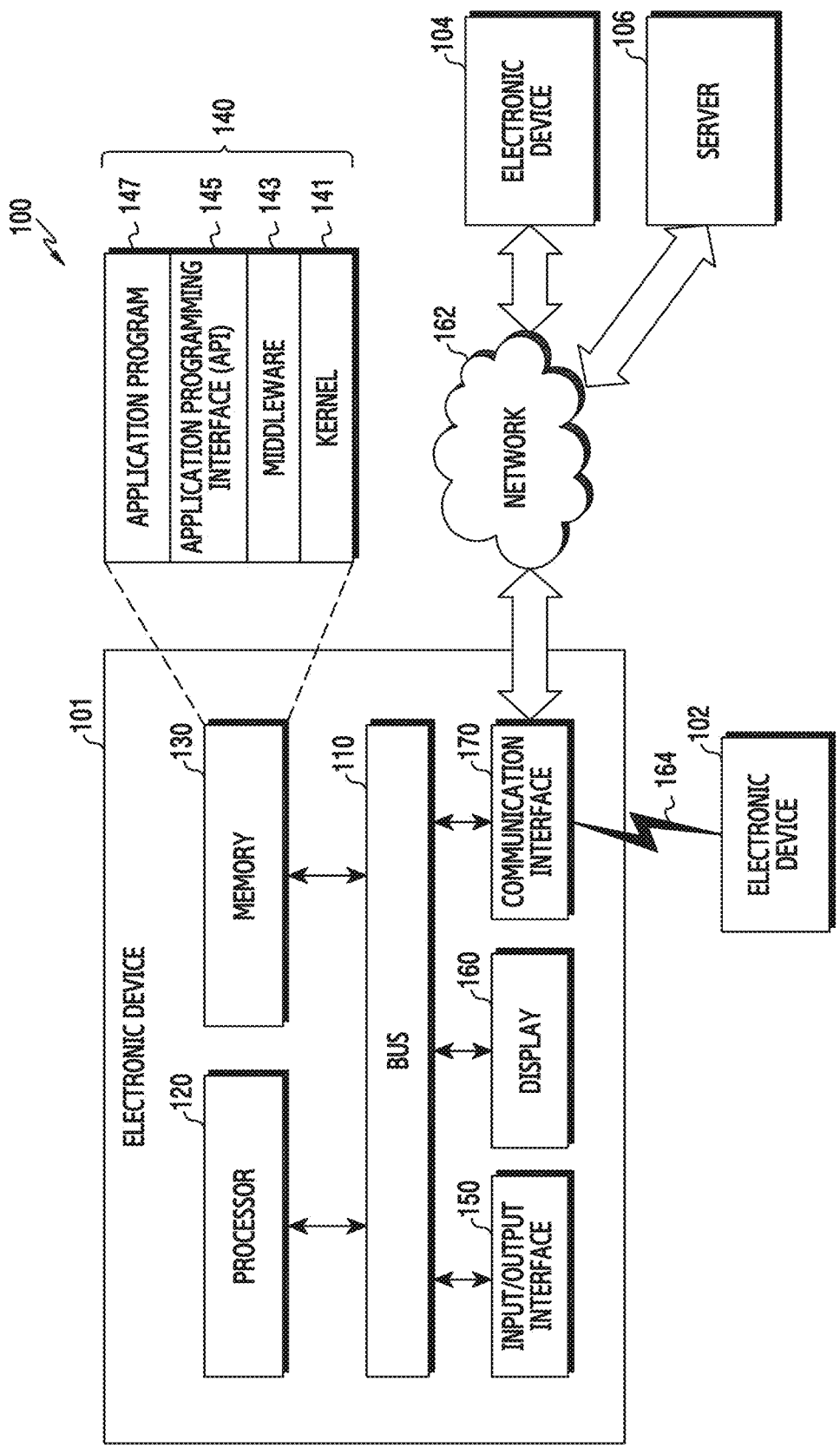
FIG. 1 illustrates an example of a network environment including an electronic device according to various embodiments.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3)

player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a block diagram of a network environment system according to an embodiment of the present disclosure.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element. The bus 110 may, for example, include a circuit coupling the constituent elements 110, 120, 150, 160 and 170 with one another and forwarding communication (e.g., a control message or data) between the constituent elements. The processor 120 may include one or more of a central processing unit (CPU), an application processor (AP) or a communication processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like. The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
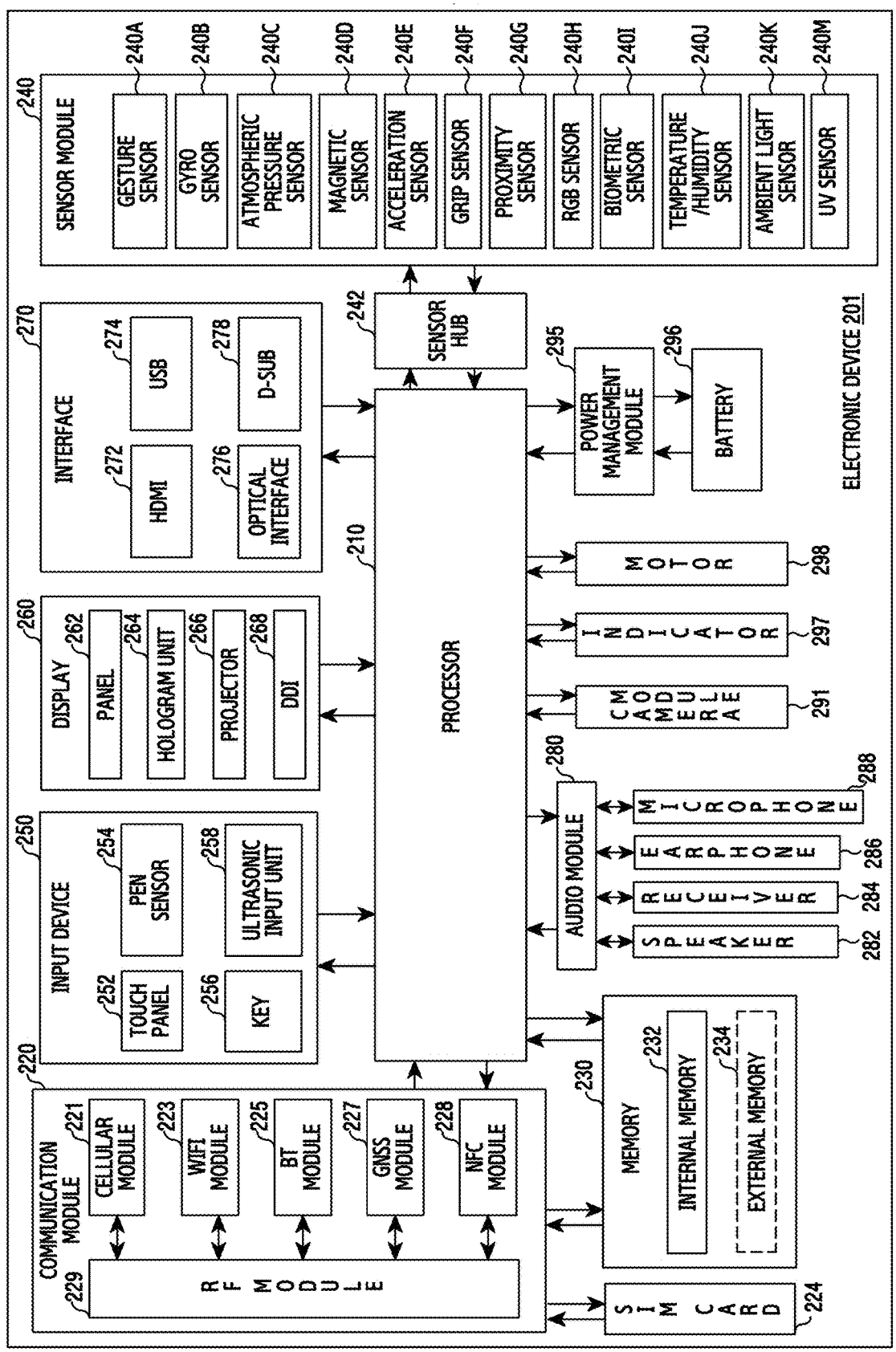
FIG. 2 illustrates a block diagram of an electronic device according to various embodiments.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, a near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G a color sensor 240H (e.g., a red, green, blue (RGB) sensor), a biometric (medical) sensor 240I, a temperature/humidity sensor 240J, an ambient light (illuminance) sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The sensor hub 242 may receive detection values from various sensors which are included in the sensor module 240, and may transmit the received detection values or a decision result which is determined based on the received detection values, to the processor 210. Further, the sensor hub 242 may receive, from the processor 210, a signal for controlling the various sensors which are included in the sensor module 240, and may control the various sensors based on the received signal. The sensor hub 242 may be configured with various form. For example, the sensor hub 242 may be located within or outside of the processor 210. If the sensor hub 242 is located outside of the processor 210, the sensor hub 242 may include a supplementary processor. The sensor hub 242 may be included in the processor 210 in the form of the supplementary processor. For another example, the sensor hub 242 may be stored in the memory as at least one module in the form of instructions.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, a display driver interface (DDI) 268, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. The DDI 268 may adjust a luminance by controlling a ratio between an on duration and an off duration of the panel 262. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like). The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
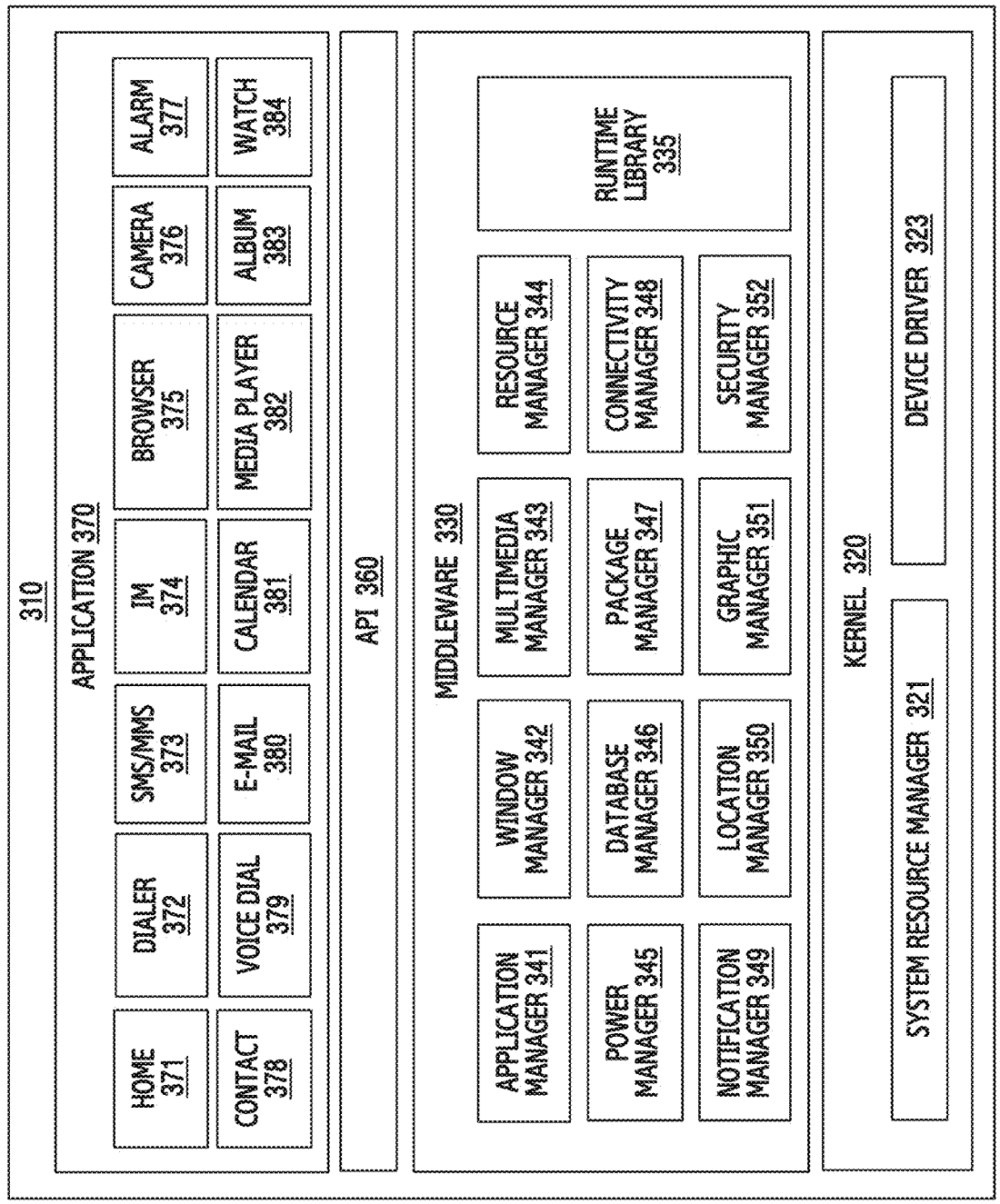
FIG. 3 illustrates a block diagram of a program module according to various embodiments.

FIG. 3 illustrates a block diagram of a program module according to various embodiments.

According to an embodiment, the program module 310 (e.g., the program 140) may include an operating system (OS) controlling resources related to an electronic device (e.g., the electronic device 101 or 201) and/or various applications (e.g., the application program 147) run on the operating system. The operating system may, for example, include Android™, iOS™, Windows™, Symbian™, Tizen™, or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloadable from an external electronic device (e.g., the electronic device 102 or 104, the server 106, etc.).

The kernel 320 may, for example, include a system resource manager 321 and/or a device driver 323. The system resource manager 321 may perform control of a system resource, allocation thereof, or recovery thereof. According to an embodiment, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, or an inter-process communication (IPC) driver. The middleware 330 may, for example, provide a function that the application 370 needs in common, or provide various functions to the application 370 through the API 360 wherein the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes so as to add a new function through a programming language while the application 370 is executed. The runtime library 335 may perform input output management, memory management, or arithmetic function processing. The application manager 341 may, for example, manage a lifecycle of the application 370. The window manager 342 may manage a GUI resource which is used for a screen. The multimedia manager 343 may obtain a format used for playing media files, and perform encoding or decoding of the media file by using a codec suitable to the corresponding format. The resource manager 344 may manage a source code of the application 370 or a space of a memory. The power manager 345 may, for example, manage a battery capacity, temperature or power supply, and identify or provide power information used for an operation of an electronic device by using corresponding information among this. According to an embodiment, the power manager 345 may interwork with a basic input/output system (BIOS). The database manager 346 may, for example, provide, search or change a database that will be used in the application 370. The package manager 347 may manage the installing or refining of an application that is distributed in the form of a package file.

The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to the user, or a user interface related with this. The security manager 352 may, for example, provide system security or user authentication. According to an embodiment, the middleware 330 may include a telephony manager for managing a voice or video call function of the electronic device, or a middleware module capable of forming a combination of functions of the aforementioned constituent elements. According to an embodiment, the middleware 330 may provide a module that is specialized by type of an operating system. The middleware 330 may dynamically delete some of the existing constituent elements, or add new constituent elements. The API 360 is, for example, a set of API programming functions, and may be provided to have another construction according to the operating system. For example, Android or iOS may provide one API set by platform, and Tizen may provide two or more API sets by platform.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to an embodiment, the application 370 may include an information exchange application capable of supporting information exchange between an electronic device and an external electronic device. The information exchange application may, for example, include a notification relay application for relaying specific information to the external electronic device, or a device management application for managing the external electronic device. For example, the notification relay application may relay notification information provided in another application of the electronic device, to the external electronic device, or receive notification information from the external electronic device and provide the received notification information to a user. The device management application may, for example, install, delete, or refine a function (e.g., turned-on/turned-off of the external electronic device itself (or some components) or adjustment of a brightness (or resolution) of a display) of the external electronic device which communicates with the electronic device, or an application which operates in the external electronic device. According to an embodiment, the application 370 may include an application (e.g., a health care application of a mobile medical instrument) designated according to properties of the external electronic device. According to an embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

The term "module" used in the document may include a unit consisting of hardware, software or firmware, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an application-specific integrated circuit (ASIC) chip, a field-programmable gate array (FPGA) or a programmable logic device, which has been known or will be developed in future, performing some operations. At least a part of an apparatus (e.g., modules or functions thereof) or method (e.g., operations) according to various embodiments may, for example, be implemented as an instruction which is stored in a computer-readable storage medium (e.g., the memory 130) in the form of a program module. In response to the instruction being executed by a processor (e.g., the processor 120 of FIG. 1 or the processor 210 of FIG. 2), the processor may perform a function corresponding to the instruction.

The computer-readable recording medium may include a hard disk, a floppy disk, a magnetic medium (e.g., a magnetic tape), an optical recording medium (e.g., a compact disk-read only memory (CD-ROM), a digital versatile disk (DVD)), a magneto-optical medium (e.g., a floptical disk), an internal memory, etc. The instruction may include a code which is made by a compiler or a code which is executable by an interpreter. The module or program module according to various embodiments may include at least one or more of the aforementioned constituent elements, or omit some of them, or further include another constituent element. Operations carried out by the module, the program module or the another constituent element according to various embodiments may be executed in a sequential, parallel, repeated or heuristic manner, or at least some operations may be executed in different order or may be omitted, or another operation may be added.

Figure 4:
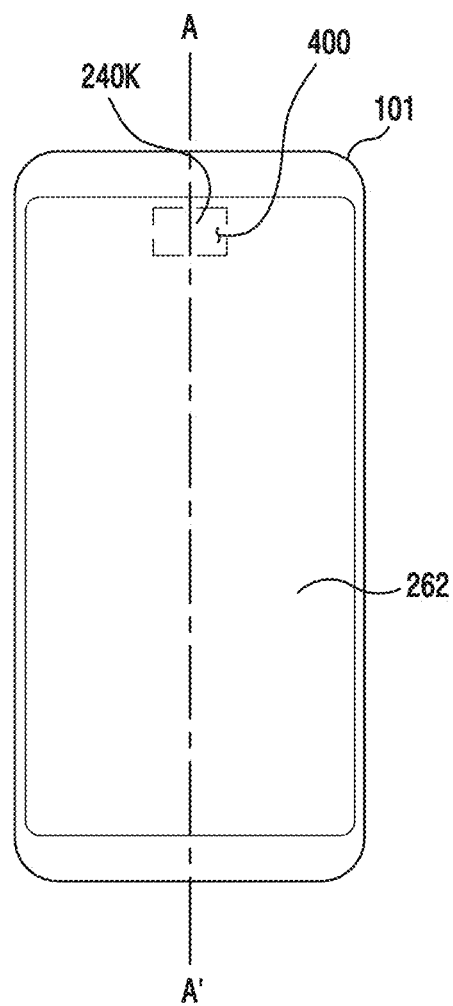
FIG. 4 illustrates an example of disposing an ambient light sensor in an electronic device according to various embodiments.

FIG. 4 illustrates an example of disposing an ambient light sensor in an electronic device according to various embodiments.

Referring to FIG. 4, the electronic device 101 may include the ambient light sensor 240K and the display 260. The display 260 may include the panel 262. The ambient light sensor 240K and the panel 262 may be disposed in a front surface of the electronic device 101. In various embodiments, the ambient light sensor 240K may be disposed in a region 400 related with the panel 262 wherein the ambient light sensor 240K is not exposed to the front surface (or outside the electronic device 101) of the electronic device 101. For example, the ambient light sensor 240K may be positioned in the region 400 of a lower end of the panel 262. For another example, the ambient light sensor 240K may be positioned in the region 400 included in the panel 262. A structure of the region 400 will be exemplified through FIG. 5A and FIG. 5B.

In various embodiments, the display 260 includes the ambient light sensor 240K disposed not to be exposed to the front surface of the panel 262, whereby the electronic device 101 may provide a wider screen than an electronic device including an ambient light sensor disposed to be exposed to the front surface of the panel 262 (e.g., an ambient light sensor, etc. disposed in a bezel region of the electronic device).

FIG. 4 illustrates an example in which the ambient light sensor 240K is disposed at a left upper end of the panel 262, but the ambient light sensor 240K may be disposed in another region as well. For example, the ambient light sensor 240K may be positioned in at least one of a middle upper end, right upper end, left middle end, middle end, left lower end, middle lower end, or right lower end of the panel 262. However, a position where the ambient light sensor 240K is disposed is not limited to the aforementioned example. For example, the ambient light sensor 240K may be positioned in a bezel region of the electronic device 101 or a side surface or rear surface of the electronic device 101 as well.

Figure 5A:
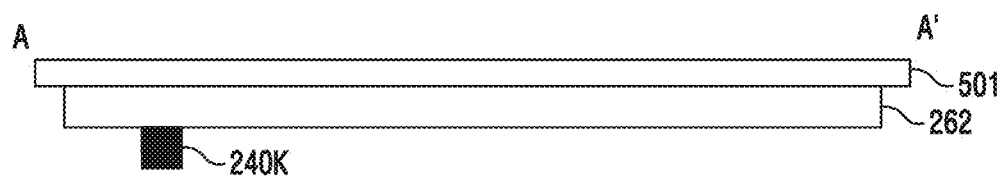
FIGS. 5A and 5B illustrate examples of a structure of a region where an ambient light sensor of an electronic device is disposed according to various embodiments.

FIG. 5A illustrates an example of a structure of a region in which an ambient light sensor of an electronic device is disposed according to various embodiments. FIG. 5A illustrates a part of a section of the electronic device 101 which is taken along line A-A' of FIG. 4.

Referring to FIG. 5A, the electronic device 101 may include the ambient light sensor 240K, a glass 501, and the panel 262 of the display 260. Although not illustrated in FIG. 5A, the panel 262 may further include another component for displaying a screen. For example, the panel 262 may further include a polarization plate, a TFT-array substrate, a color filter substrate, etc. In some embodiments, the panel 262 may be comprised of a light emitting diode (LED) panel or a liquid crystal display (LCD) panel.

The panel 262 may be disposed beneath the glass 501. The ambient light sensor 240K may be disposed beneath the panel 262.

The region 400 may include at least a part of the glass 501 and at least a part of the panel 262. The at least part of the panel 262 may be disposed beneath the at least part of the glass 501. The ambient light sensor 240K may be disposed beneath the at least part of the panel 262. In other words, the region 400 may indicate a region where the ambient light sensor 240K is positioned beneath the panel 262.

Figure 5B:
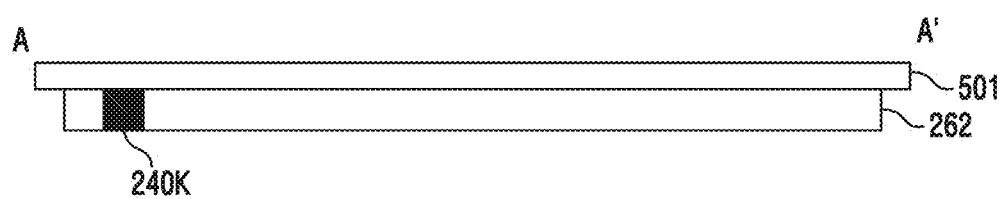

FIG. 5B illustrates another example of a structure of a region where an ambient light sensor of an electronic device according to various embodiments is disposed. FIG. 5B illustrates a part of a section of the electronic device 101 which is taken along line A-A' of FIG. 4.

Referring to FIG. 5B, the electronic device 101 may include the ambient light sensor 240K, the glass 501, and the panel 262. In some embodiments, the panel 262 may consist of a LED. In other some embodiments, the panel 262 may be comprised of a liquid crystal display (LCD) which further includes a backlight unit (not shown).

Unlike the structure illustrated in FIG. 5A, the ambient light sensor 240K may be included in at least a partial region of the panel 262. For example, the ambient light sensor 240K may be disposed in a boundary region between the panel 22 and a bezel of the electronic device 101. In this embodiment, the ambient light sensor 240K may be included in the partial region of the panel 262.

The region 400 may be comprised of at least a part of the glass 501, at least a part of the panel 262, and the ambient light sensor 240K. The at least part of the panel 262 may be disposed beneath the at least part of the glass 501. The ambient light sensor 240K may be included in the at least part of the panel 262. For example, the ambient light sensor 240K may be disposed between a plurality of elements scattering light (or rays) and included in the panel 262.

Figure 6:
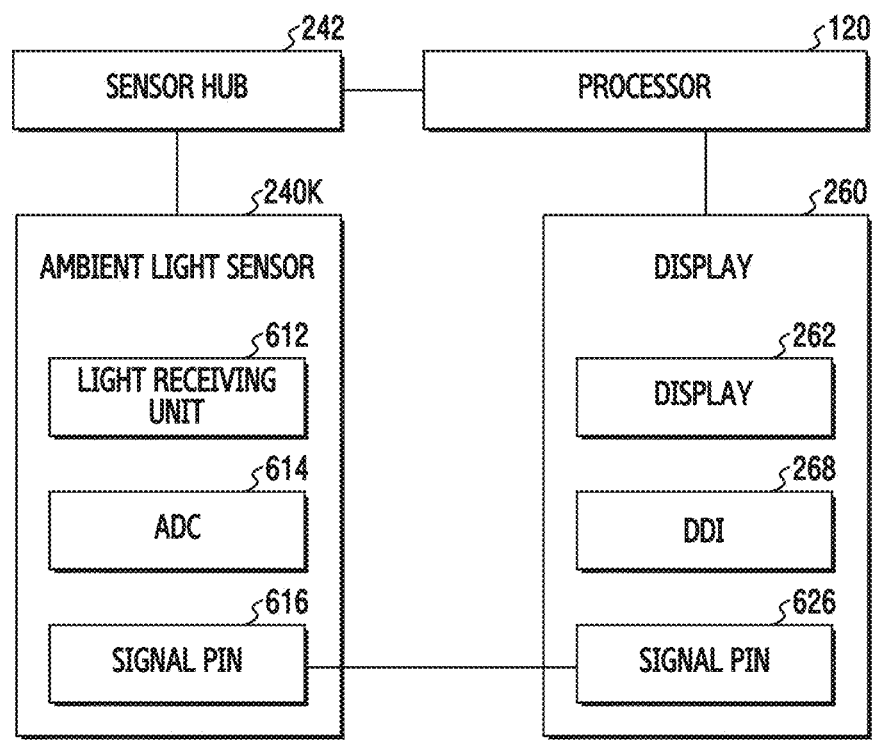
FIG. 6 illustrates an example of a functional construction of an electronic device according to various embodiments.

FIG. 6 illustrates an example of a functional construction of an electronic device according to various embodiments.

Referring to FIG. 6, the electronic device 101 may include the processor 120, the sensor hub 242, the ambient light sensor 240K, and the display 260.

The processor 120, the sensor hub 242, the ambient light sensor 240K, and/or the display 260 may be coupled to one another. For example, at least some of the processor 120, the ambient light sensor 240K and the display 260 may be directly connected to one another. For another example, at least some of the processor 120, the ambient light sensor 240K and the display 260 may be indirectly connected to one another through another device or circuit.

In various embodiments, the processor 120 may be configured to execute instructions stored in the memory 130 in order for the ambient light sensor 240K to receive light (or rays) (e.g., be configured to control one or more of the ambient light sensor 240K or the sensor hub 242 to receive light). For further example, the processor 120 may be configured to execute the stored instructions in order to change a luminance of the panel 262.

In accordance with embodiments, the processor 120 may be comprised of one or more processors. At least some of the one or more processors may be included in another component included in the electronic device 101. For example, at least some of the one or more processors may be included the sensor hub 242, the ambient light sensor 240K, and/or the display 260.

In various embodiments, the processor 120 may receive information related with light (or rays) from the ambient light sensor 240K. In some embodiments, the processor 120 may receive the information related with the light from the ambient light sensor 240K, through the sensor hub 242. The information related with the light may include data for indicating an illuminance of light around the electronic device 101. The data for indicating the illuminance may be configured with a digital format. The data for indicating the illuminance may directly indicate the illuminance of the light, or indirectly indicate through an index, an indication, etc. In response to the data for indicating the illuminance being indicated through the index, etc., the processor 120 may identify the illuminance of the light by using a table including information about a relationship between the illuminance and the index. The table may be stored in the memory 130.

In various embodiments, the processor 120 may identify a brightness (or luminance) of a screen outputted (or displayed) through the panel 262 included in the display 260, based on the information related with the light received from the ambient light sensor 240K. The information related with the light may include data regarding light around the electronic device 101 measured through the light receiving unit 612 of the ambient light sensor 240K. The processor 120 may control a brightness (or luminance) of a screen of the panel 262, based at least in part on data related with an illuminance. The processor 120 may identify the luminance of the screen through the panel 262, as a value corresponding to the illuminance. For example, in response to the data related with the illuminance being equal to or being greater than a designated value, the processor 120 may increase the luminance of the panel 262. The luminance of the screen outputted through the panel 262 may be in proportion to the illuminance.

In various embodiments, the processor 120 may provide information on the luminance to the display 260. The processor 120 may provide the information on the luminance to the display driver interface (DDI) 268 included in the display 260. The information on the luminance may be implemented in various formats. For example, the information on the luminance may be configured with an indirect format such as an index, an indicator, etc. as well.

In various embodiments, the processor 120 may receive information of light in an environment related with the electronic device 101, from the ambient light sensor 240K. In some embodiments, the processor 120 may receive the information of the light in the environment related with the electronic device 101, through the sensor hub 242. The sensor hub 242 may receive the information of the light from the ambient light sensor 240K, and forward the received information to the processor 120, or process and transmit the received data to the processor 120.

In various embodiments, the processor 120 may identify whether the ambient light sensor 240K will receive light by using the light receiving unit 612. For example, the processor 120 may configure (or control) a state of the light receiving unit 612 (or a state of the ambient light sensor 240K) as an ON state, an active state or a measuring state that is a state capable of receiving light. In some embodiments, the processor 120 may identify whether the ambient light sensor 240K will receive light by using the light receiving unit 612, through the sensor hub 242.

In various embodiments, the processor 120 may sense ambient light of the electronic device 101 by using the ambient light sensor 240K during a first duration, in a state in which the display 260 is turned off, and identify setting for being used for the ambient light sensor 240K, based at least in part on a characteristic of the ambient light, and sense the ambient light of the electronic device through the ambient light sensor 240K during a second duration, based at least in part on the identified setting, and control a function of the display 260, based at least in part on the characteristic of the ambient light sensed during the second duration.

In various embodiments, the processor 120 may identify a first duration of time as a light measuring duration of the ambient light sensor in response to the characteristic of the received light satisfying the designated condition, and identify a second duration of time as the light measuring duration in response to the characteristic not satisfying the designated condition. The processor 120 may activate the light receiving unit 612 of the ambient light sensor 240K during the first duration of time, and activate the light receiving unit 612 during a part of the second duration of time, and inactivate the light receiving unit 612 during another part of the second duration of time.

In various embodiments, the processor 120 may identify the setting (or a configuration mode or a setting mode) of the ambient light sensor 240K. The setting of the ambient light sensor 240K may include a first configuration and/or a second configuration according to a time and/or operation of receiving light through the ambient light sensor 240K. For example, the setting of the ambient light sensor 240K may include the first configuration of receiving, during a first duration, light of an environment where the electronic device 101 is located (or around the electronic device 101), in a state in which the display 260 is turned off. For another example, the setting of the ambient light sensor 240K may include the second configuration of receiving light around the electronic device 101 during a second duration. In the second configuration, the light receiving unit 612 of the ambient light sensor 240K may receive light during the second duration of time. The second duration of time may include one or more first intervals and one or more second intervals. The one or more first intervals are part of the second duration of time for which the light receiving unit 612 of the ambient light sensor 240K operates in an active state, and the one or more second intervals are part of the second duration of time for which the light receiving unit 612 of the ambient light sensor 240K operates in an idle state. In some embodiments, the setting of the ambient light sensor 240K may include a third configuration (or mode) different from the second configuration, and receiving light during a third duration of time during the second duration according to an illuminance measured during the first duration. In the third configuration, the light receiving unit 612 of the ambient light sensor 240K may be activated during the third duration of time, and receive light. In some embodiments, the third duration of time may correspond to a duration of time of measuring light during the first duration of the first configuration. A detailed description of the setting of the ambient light sensor 240K will be made later.

In various embodiments, the processor 120 may control the light receiving unit 612 of the ambient light sensor 240K, based on the identified setting (or configuration mode or setting mode) of the ambient light sensor 240K. For example, in the first configuration, the processor 120 may control the light receiving unit 612 to receive light of an environment where the electronic device 101 is located during the first duration of time. For another example, in the second configuration, the processor 120 may control the light receiving unit 612 to receive light of an environment where the electronic device 101 is located during the second duration of time. The processor 120 may control to stop the operation of receiving the light after the second duration of time. The second duration of time may include one or more first intervals in which the light receiving unit 612 of the ambient light sensor 240K operates in an active state and one or more second intervals in which the light receiving unit 612 of the ambient light sensor 240K operates in an idle state. An integration of the first intervals may correspond to the third duration of time of the third configuration. For further example, in the third configuration, the processor 120 may control the light receiving unit 612 to receive light of an environment where the electronic device 101 is located during the third duration of time.

In various embodiments, the processor 120 may identify the configuration corresponding to the environment where the electronic device 101 is located among the first configuration, the second configuration or the third configuration, as a configuration of the ambient light sensor 240K. In some embodiments, the processor 120 may identify the configuration (or configuration mode or setting mode) of the ambient light sensor 240K, based on a designated value. For example, the ambient light sensor 240K may measure an illuminance, based on the first configuration. In response to the measured illuminance being equal to or being greater than about 700 lux (lx) for example, the processor 120 may identify to change (convert) the setting of the ambient light sensor 240K from the first configuration to the second configuration. In response to the measured illuminance being less than about 700 lx for example, the processor 120 may identify to change (convert) the setting of the ambient light sensor 240K from the first configuration to the third configuration. In other some embodiments, the processor 120 may identify the setting of the ambient light sensor 240K through the sensor hub 242. The sensor hub 242 may include a supplementary processor, and may replace and perform at least part of the operation of the processor 120 of identifying the setting of the ambient light sensor 240K.

In various embodiments, the processor 120 may receive a state signal from the display 260 through the signal pin 616 included in the ambient light sensor 240K. The state signal may be transmitted from the display 260 to the signal pin 616 through the signal pin 626. The state signal may be transmitted to the processor 120 through the signal pin 616. The state signal may include a pulse signal related with a state of the panel 262. In accordance with an embodiment, the state signal may be denoted as a synchronization signal or a sync signal. Also, the signal pin may be denoted as a synchronization pin or a sync pin. The terms denoting the state signal and the signal pin are not limited to the statement of this specification.

The state signal may indicate data related with a screen displayed through the panel 262. The processor 120 may identify the state signal received through the signal pin 616. The processor 120 may identify a state of the light receiving unit 612, based on the state signal. For example, the state signal may indicate information about whether the screen is in an active state. The processor 120 may determine or identify a duration for which light scattered or outputted by the screen does not affect the light receiving unit 612, based on the state signal. On the basis of the determining or identifying, the processor 120 may identify the activity or non-activity of the light receiving unit 612 (or the state of the light receiving unit 612 or the setting of the ambient light sensor 240K).

In various embodiments, the processor 120 may receive the state signal through the sensor hub 242. The sensor hub 242 may include a supplementary processor, and may replace and perform at least part of an operation of the processor 120 related with the state signal.

In various embodiments, the processor 120 may identify a state of the display 260, and control the ambient light sensor 240K, based on the identified state of the display 260. For example, the processor 120 may receive information related with the state of the display 260 through the DDI 268. In accordance with an embodiment, the processor 120 may identify the state of the display 260, based on the received information, and control a state of the ambient light sensor 240K, based at least in part on the state of the display 260. In accordance with an embodiment, the processor 120 may identify the state of the display 260, based on the received information, and control the state of the ambient light sensor 240K, through transmitting the information related with the state of the display 260 to the sensor hub 242.

In various embodiments, the sensor hub 242 may be connected with the ambient light sensor 240K. The processor 120 and the ambient light sensor 240K may be associated by the sensor hub 242K. The sensor hub 242 may include a supplementary processor. In some embodiments, the processor 120 may include the sensor hub 242. Within the processor 120, the sensor hub 242 may control at least part of an operation related with the ambient light sensor 240K. In other some embodiments, the sensor hub 242 may be positioned outside the processor 120, and control the at least part of the operation related with the ambient light sensor 240K.

In various embodiments, the sensor hub 242 may operate at low power (or low power supply). For example, the sensor hub 242 may continuously operate unlike other components activated or inactivated according to a power state of the electronic device 101. In accordance with embodiments, the sensor hub 242 may be denoted as a context hub, a supplementary processor, etc. The term denoting the sensor hub 242 is not limited to the aforementioned example.

In various embodiments, the ambient light sensor 240K may include the light receiving unit 612, an analog-to-digital converter (ADC) 614, and/or the signal pin 616.

The ambient light sensor 240K may be a component of the electronic device 101 for measuring an illuminance. In various embodiments, the ambient light sensor 240K may sense various kinds of light. For example, the ambient light sensor 240K may sense visible light, infrared ray, ultra violet, etc. However, the kind of light that the ambient light sensor 240K may sense is not limited to this.

In various embodiments, the ambient light sensor 240K may include various kinds of sensors that use an intensity of light. For example, the ambient light sensor 240K may include at least one of a proximity sensor, a spectrometer sensor and/or an ultraviolet (UV) sensor. In accordance with embodiments, the ambient light sensor 240K may be an optical sensor unit.

In various embodiments, the ambient light sensor 240K may receive light, in order to measure, identify or obtain an illuminance of an environment where the electronic device 101 is located. For example, the ambient light sensor 240K may collect light of the environment where the electronic device 101 is located, through the light receiving unit 612 included in the ambient light sensor 240K.

In various embodiments, the light receiving unit 612 may receive light within the environment where the electronic device 101 is located. In some embodiments, a state of light of the environment where the electronic device 101 is located may include a state in which an illuminance of the light satisfies a designated condition and a state in which the illuminance does not satisfy the designated condition. For example, the state of the light may include a state in which the illuminance is equal to or is greater than a designated value and a state in which the illuminance is less than the designated value.

In various embodiments, the light receiving unit 612 may collect light around the electronic device 101. The light receiving unit 612 may obtain light scattered around the electronic device 101.

In various embodiments, the light receiving unit 612 may include channels capable of measuring light. The light receiving unit 612 may include a red (R) channel for receiving red-series light, a green (G) channel for receiving green-series light, a blue (B) channel for receiving blue-series light, and a C channel for receiving white light. In some embodiments, the R channel, the G channel, the B channel, and the C channel each may include elements capable of receiving light. For example, the R channel, the G channel, the B channel, and the C channel each may include a photo diode capable of receiving visible light.

In various embodiments, the light receiving unit 612 may provide analog data on light, based on the light received through the at least one channel. In accordance with an embodiment, the analog data may be received every designated cycle, or may be received according to the occurrence of a specific event.

In various embodiments, the ADC 614 may convert analog data into digital data. The ADC 614 and the light receiving unit 612 may be directly connected with each other within the ambient light sensor 240K, or may be indirectly connected with each other through another component within the ambient light sensor 240K. The ADC 614 may receive the analog data provided through the light receiving unit 612. The analog data may be received every designated cycle, or may be received according to the occurrence of a specific event. The ADC 614 may convert the received analog data into digital data.

In various embodiments, the ADC 614 may directly or indirectly transmit or provide the converted digital data to the sensor hub 242. In accordance with an embodiment, the digital data may be transmitted every designated cycle, or may be transmitted according to the occurrence of a specific event. The light receiving unit 612 and the ADC 614 will be described later through FIG. 7.

In various embodiments, the signal pin 616 may be connected with the signal pin 626 of the display 260. The connection between the signal pin 616 and the signal pin 626 may be wired connection, or may be wireless connection. A path between the signal pin 616 and the signal pin 626 may be implemented through various connection interfaces. For example, the path may be a mobile industry processor interface (MIPI), a mobile display digital interface (MDDI), etc.

In various embodiments, the signal pin 616 and/or the signal pin 626 may be included in a pin used for data transmission included within the electronic device 101 or a pin for transmitting a control signal.

In various embodiments, the signal pin 616 and the signal pin 626 may include a separate exclusive pin that is used for transmitting a synchronization signal (or sync signal) between the ambient light sensor 240K and the display 260. In some embodiments, in response to the including of the exclusive pin of a use for transmitting the synchronization signal between the ambient light sensor 240K and the display 260, the ambient light sensor 240K may fast and accurately receive a signal related with a change of a state of the display 260. On the basis of the received signal, the ambient light sensor 240K may precisely control an operation of the ambient light sensor 240K in relation with the state of the display 260. In various embodiments, the signal pin 616 may be used to receive a state signal from the display 620. For example, the signal pin 616 may receive the state signal via the signal pin 626 from the display 260. The state signal may indicate information for indicating the state of the display 260. The state of the display 260 may include an activated state (or a turn-on state or an emitting state) of a screen outputted through the panel 262 and an inactivated state (or a turn-off state, an idle state or non-emitting state) of the screen outputted through the panel 262.

In some embodiments, the state signal may indicate information for indicating that a specified scanning line among a plurality of scanning lines is activated. The state signal may be received to the signal pin 616 via the signal pin 626 of the display 260 from the display 260. The signal pin 616 may provide the state signal to the sensor hub 242 connected with the ambient light sensor 240K.

In various embodiments, the display 260 may be a component of the electronic device 101 for providing a screen. In various embodiments, the display 260 may be configured with various formats. For example, the display 260 may include at least one of an organic light emitting diode (OLED), a quantum-dot light emitting diode (QLED) and/or a liquid crystal display (LCD). The display 260 may correspond to the display 160 of FIG. 1.

In various embodiments, the display 260 may include the panel 262, the display driver interface (DDI) 268 and the signal pin 626.

The display 260 may include the panel 262. In various embodiments, the panel 262 may be divided into a plurality of pixels, a plurality of thin film transistors (TFTs), etc. The plurality of pixels may consist of rows and columns. The pixel, the smallest unit capable of dividing a screen, may indicate each small dot of the screen consisting of the rows and the columns. The pixel may be denoted as a picture element.

In various embodiments, the panel 262 may display the screen, based on an operation of repeating an activation state and inactivation state of the panel 262, in a state in which the display 260 is activated. The panel 262 may display the screen, based on an operation of repeating an activation state and inactivation state of a plurality of elements or a plurality of scanning lines included in the panel 262, in a state in which the display 260 is activated.

In various embodiments, the panel 262 may scatter or output light in order to provide information. For example, the panel 262 may include a plurality of elements scattering or outputting light. The plurality of elements may be grouped (or mapped) into a plurality of groups. In some embodiments, the plurality of elements may be grouped (or mapped) into a plurality of scanning lines which are arranged in a specific direction. For example, the display 260 may include the plurality of scanning lines of a B number including the plurality of elements of an A number. The A and B may be configured variously according to a resolution of the electronic device 101. In accordance with embodiments, the plurality of elements may be denoted as a plurality of pixels or a plurality of picture elements as well.

In accordance with embodiments, at least one element included in a first scanning line among the plurality of scanning lines scatters light at a first timing and does not scatter light at a second timing, and at least one element included in a second scanning line among the plurality of scanning lines does not scatter light at the first timing, and may scatter light at the second timing. In other words, by outputting light by scanning line, the display 260 may refine the screen. A detailed description related with the scanning line will be made later through FIG. 8.

In various embodiments, the panel 262 may provide a state signal to the signal pin 626, in response to at least some of the plurality of elements of the panel 262 being activated. In some embodiments, the panel 262 may provide the signal pin 626 with a state signal of indicating that at least one of the plurality of elements of the panel 262 is converted into an active state, or provide the signal pin 626 with a state signal of indicating that at least one of the plurality of elements of the panel 262 is converted into an inactive state. For example, the panel 262 may provide a state signal of indicating that a specified scanning line among the plurality of scanning lines of the panel 262 is converted into the active state, or provide a state signal of indicating that a specified scanning line among the plurality of scanning lines of the panel 262 is converted into the inactive state. The state signal may be provided, based on that a component (e.g., a specified scanning line or at least one element) included in the panel 262 is provided with a power supply. In accordance with embodiments, the state signal may be provided through the processor 120 and/or the DDI 268.

In various embodiments, the display 260 may include the display driver interface (DDI) 268. The DDI 268 may include a semiconductor for controlling the display 260.

In various embodiments, the DDI 268 may be connected with the panel 262 through a flexible printed circuit board (FPCB) or a film. In some embodiments, the DDI 268 may be configured independently of the panel 262. In accordance with embodiments, the DDI 268 may control a signal and/or data related with an operation of the display 260. The DDI 268 may control the display 260 to display an image, a video and/or and the like within a screen displayed through the panel 262.

In various embodiments, the DDI 268 may control a luminance of a screen displayed through the panel 262. For example, the DDI 268 may control a color, brightness, etc. of the screen displayed through the panel 262, according to the control of the processor 120. For another example, the DDI 268 may configure a luminance of the panel 262 as a value corresponding to an illuminance identified through the ambient light sensor 240K, according to the control of the processor 120. For further example, the DDI 268 may control a duty ratio related with an ON/OFF rate of the screen according to the control of the processor 120. The duty ratio may be a rate between an active duration and inactive duration of the panel 262 within one period. For example, the duty ratio may be a rate of a length of the one period and a length of the active duration of the panel 262. The duty ratio and the luminance may be in a proportional relationship.

In various embodiments, the DDI 268 may control a screen displayed through the panel 262, through designated information or rule. For example, the DDI 268 may decrease or eliminate, for example, a brightness of blue light, in response to receiving a specified input. The input may be related with an indicator, a control window and/or a pop-up window which is displayed on the screen outputted through the panel 262. The user input may include a tap, a double tap, a drag, reception of a sound related signal, and/or the like.

In various embodiments, the signal pin 626 may provide the state signal to the processor 120 through the signal pin 616. The signal pin 626 may provide the state signal to the processor 120 through the signal pin 616, in response to the specified scanning line or at least one element being activated or inactivated. In some embodiments, the state signal may be provided to the sensor hub 242. The provided state signal may be provided to the processor 120 through the sensor hub 242.

As described above, the ambient light sensor 240K included in the electronic device 101 according to various embodiments may receive light (or rays) of an environment where the electronic device 101 is located, during a first duration of time through the light receiving unit 612. Information about the received light may have an analog format. The ADC 614 of the ambient light sensor 240K may convert the information about the light into a digital format, and provide to the processor 120. On the basis of the provided information, the processor 120 may identify a first illuminance of the light received during the first duration. The processor 120 may identify the setting of the ambient light sensor 240K, based on the identified first illuminance. The setting may include one or more of the first configuration, the second configuration, or the third configuration. The processor 120 may control the ambient light sensor 240K to operate according to the identified setting. For example, in response to the identified setting being the second configuration, the processor 120 may control the ambient light sensor 240K to receive light during a second duration of time. The second duration of time may include one or more active durations (or first intervals) during which the light receiving unit 612 operates in an active state (e.g., a state in which the light receiving unit 612 may receive light), and one or more inactive durations (or second intervals) during which the light receiving unit 612 operates in an inactive state (e.g., a state in which the light receiving unit 612 does not receive light). The processor 120 may identify a second illuminance of light received during the second duration of time. The processor 120 may identify a luminance of the display 260, based on information about the provided second illuminance. For example, the processor 120 may identify the luminance of the display 260, by a value corresponding to the second illuminance. The processor 120 may provide information about the identified luminance to the display 260. The panel 262 may output a screen, based on the identified luminance. In some embodiments, the sensor hub 242 may replace at least part of an operation of the processor 120. The sensor hub 242 may receive the information about the illuminance from the ambient light sensor 240K, and provide the information about the illuminance to the processor 120.

Meantime, the panel 262 of the display 260 may provide a state signal to the signal pin 626, in response to one or more elements (e.g., one or more elements included within a specified scanning line) among a plurality of elements scattering light being activated (or inactivated). The state signal may be received to the signal pin 616 through the signal pin 626. The state signal received to the signal pin 616 may be provided to the processor 120. The processor 120 may identify a timing (i.e., an activation initiation timing) at which the ambient light sensor 240K (or the light receiving unit 612 of the ambient light sensor 240K) is activated, based at least in part on a timing at which the state signal is received. The processor 120 may control an operation of the ambient light sensor 240K, based at least in part on the identified timing and a state of the identified ambient light sensor 240K. In some embodiments, the state signal may be provided to the processor 120 through the sensor hub 242.

The sensor hub 242 may replace and perform at least part of an operation of the processor 120 of controlling the ambient light sensor 240K.

Figure 7:
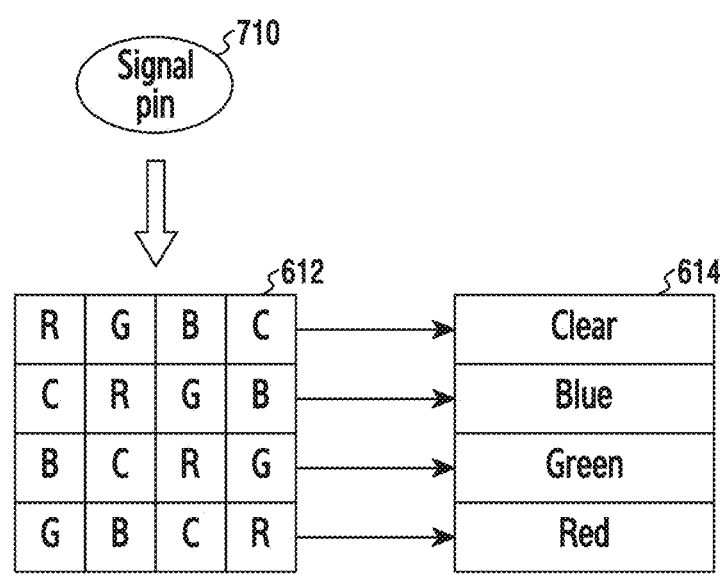
FIG. 7 illustrates an example of a construction of an ambient light sensor according to various embodiments.

FIG. 7 illustrates an example of a construction of an ambient light sensor according to various embodiments.

Referring to FIG. 7, the ambient light sensor 240K may include the light receiving unit 612 and the analog to digital converter (ADC) 614. In accordance with embodiments, the light receiving unit 612 may be denoted as a measuring unit, a sensing unit, etc. In accordance with embodiments, the ADC 614 may be denoted as a converting unit, a determining unit, an illuminance value converting unit, an ADC set, etc.

In various embodiments, the light receiving unit 612 may include a red (R) channel, a green (G) channel, a blue (B) channel, and/or a clear (C) channel. The B channel may be used to receive light (ray) of a 450 nm band, and the G channel may be used to receive light of a 550 nm band, and the R channel may be used to receive light of a 650 nm band, and the C channel may be used to receive visible light. The channels may include a plurality of measuring elements capable of measuring light.

In various embodiments, the plurality of measuring elements each may include a photo diode.

In various embodiments, the light receiving unit 612 may provide data related with the illuminance, based on receiving light from a light source 710. The data related with the illuminance may be denoted as raw data or analog data. The data related with the illuminance may include a R value indicating an intensity of light related with the R channel, a G value indicating an intensity of light related with the G channel, a B value indicating an intensity of light related with the B channel, or a C value indicating an intensity of light related with the C channel. The R value, the G value, the B value and the C value may have mutually different intensities according to the type (e.g., halogen, an incandescent lamp, a fluorescent lamp, or natural light) of the light source 710 received through the light receiving unit 612.

In various embodiments, the light receiving unit 612 may provide the data related with the illuminance to the ADC 614.

In various embodiments, the ADC 614 may receive the data related with the illuminance from the light receiving unit 612. The ADC 614 may convert the data related with the illuminance into digital data. For example, the ADC 614 may convert at least one of the R value, G value, B value or C value consisting of analog data, into the digital data. The digital data converted from the analog data may be provided to the processor 120 or the sensor hub 242 of FIG. 6.

Figure 8:
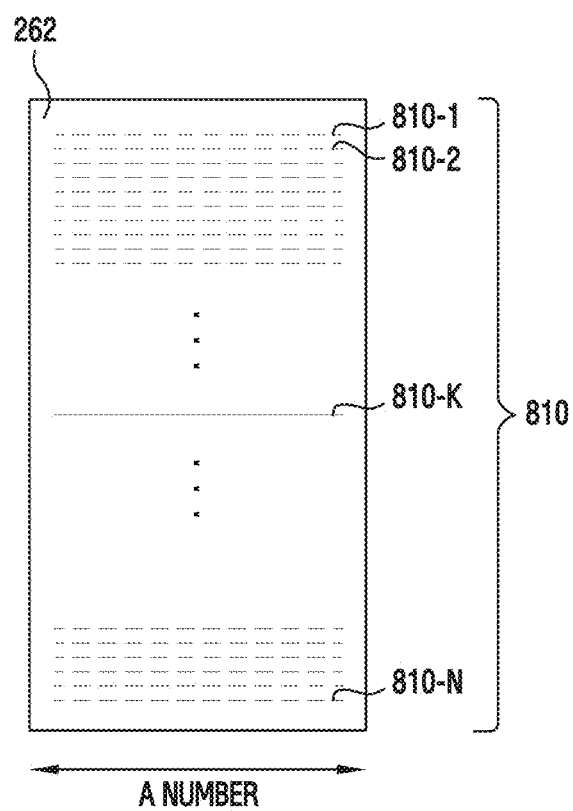
FIG. 8 illustrates an example of a scanning line included in a panel of an electronic device and an operation of the scanning line according to various embodiments.

FIG. 8 illustrates an example of a scanning line included in a panel of an electronic device and an operation of the scanning line according to various embodiments.

Referring to FIG. 8, the panel 262 may include a plurality of elements which scatter or output light (or ray). In various embodiments, the plurality of elements may be disposed to be spaced apart in X-axis and Y-axis directions. For example, the plurality of elements may be disposed by an A number in the X-axis direction, and an N number in the Y-axis direction.

In various embodiments, the plurality of elements may be grouped into a plurality of sets. For example, the plurality of sets each may include one or more elements disposed in the X-axis direction. In response to the number of the plurality of elements being an A×N number (i.e., the A number in the X-axis direction, and the N number in the Y-axis direction), the number of one or more elements disposed in the X-axis direction may be the A number. For another example, the plurality of sets each may include one or more elements disposed in the Y-axis direction. In response to the number of the plurality of elements being N×A (i.e., the N number in the X-axis direction, and the A number in the Y-axis direction), the number of one or more elements disposed in the Y-axis direction may be the A number. In accordance with embodiments, the plurality of sets may be denoted as a plurality of scanning lines 810.

The plurality of elements included in the plurality of scanning lines 810 may be turned on/off in various schemes. For example, the plurality of elements included in the plurality of scanning lines 810 may be turned on or turned off in sequence from an A number of elements included in a scanning line 810-1 to an A number of elements included in a scanning line 810-N. The panel 262 may display a screen, based on that the elements included in each of the plurality of scanning lines are turned on or turned off. The elements may be turned on or turned off, based on a designated cycle. The designated cycle may be changed adaptively according to one or more of the type of a screen displayed through the panel 262, the standard of the panel 262, or a configuration of the panel 262.

In various embodiments, the panel 262 may provide a state signal to the signal pin 626 of the display 260, in response to elements included in a specified or designated scanning line 810-*k* among the plurality of scanning lines 810 being turned on or turned off. The state signal may indicate that the specified scanning line 810-*k* is turned on or turned off. The state signal may be transmitted to the signal pin 616 of the ambient light sensor 240K through the signal pin 626. The signal pin 616 may provide the state signal to the sensor hub 242.

The sensor hub 242 may identify an active timing of the ambient light sensor 240K, based on a reception timing of the provided state signal. In other words, the ambient light sensor 240K may operate in an active state during a duration corresponding to the setting of the ambient light sensor 240K from the active timing. In some embodiments, in response to the setting of the ambient light sensor 240K being the first configuration, the ambient light sensor 240K may receive light around the electronic device 101 during the first duration of time from the identified active timing. In other some embodiments, in response to the setting of the ambient light sensor 240K being the second configuration, the ambient light sensor 240K may receive light around the electronic device 101 during the second duration of time from the identified active timing. The second duration of time may include one or more active durations and one or more inactive durations. For example, in response to the setting of the ambient light sensor 240K being the second configuration, the ambient light sensor 240K may receive light around the electronic device 101 during the second duration of time including the one or more active durations and one or more inactive durations. In further other some embodiments, in response to the setting of the ambient light sensor 240K being the third configuration, the ambient light sensor 240K may receive light around the electronic device 101 during the third duration of time from the identified timing. The third duration of time may correspond to the first duration of time.

As described above, by providing the state signal to the sensor hub 242 through the signal pin 626 and the signal pin 616 in response to the specified scanning line 810-*k* being activated or inactivated, the panel 262 may synchronize the ambient light sensor 240K and the panel 262. Through the synchronization, the electronic device 101 controls an operation of the ambient light sensor 240K according to an operation state of the panel 262, thereby being capable of preventing light related with a plurality of elements within the panel 262 from affecting an illuminance measured by the ambient light sensor 240K.

In various embodiments, the electronic device 101 may include the display 260, the ambient light sensor 240K disposed in at least a partial region of the display 260 or beneath the display 260, and/or at least one processor (e.g., the processor 120 and/or the sensor hub 242). The at least one processor may be configured to sense ambient light of the electronic device 101 by using the ambient light sensor 240K during a first duration in a state in which the display 260 is turned off, and identify the setting of the ambient light sensor 240K, based at least in part on a characteristic of the ambient light, and sense ambient light of the electronic device 101 through the ambient light sensor 240K during a second duration, based at least in part on the identified setting of the ambient light sensor 240K, and control a function of the display 260 of the electronic device 101, based at least in part on a characteristic of the ambient light sensed during the second duration.

In various embodiments, the electronic device 101 may include the display 260 comprised of at least one or more pixels, and the ambient light sensor 240K integrated into at least a partial region of the display 260. The ambient light sensor 240K may be configured to measure first ambient light of the electronic device 101 in a state in which the at least one or more pixels are turned off, and measure second ambient light of the electronic device 101 at a first period of time in response to the first ambient light satisfying a designated condition, and measure the second ambient light at a second period of time, based at least on state signals of the at least one or more pixels, in response to the first ambient light not satisfying the designated condition.

In various embodiments, the electronic device 101 may include the ambient light sensor 240K including one or more light receiving units (e.g., the light receiving unit 612) configured to receive light, the display 260, and/or one or more processors (e.g., the processor 120 and/or the sensor hub 242) coupled to the display 260 and the ambient light sensor 240K. The one or more processors may be configured to control to sense light during a first duration of time through the ambient light sensor 240K, and control to receive light during a second duration of time longer than the first duration of time through the ambient light sensor 240K in response to identifying that a first illuminance of the light received during the first duration of time is a designated condition (or a reference illuminance or designated illuminance), and control to identify a luminance of a screen outputted through the display 260 as a value corresponding to a second illuminance of the light received during the second duration of time, and display the screen, based on the identified luminance. The second duration of time may include one or more first intervals (or a part of the second duration of time) during which the light receiving unit of the ambient light sensor 240K operates in an active state, and one or more second intervals (or another part of the second duration of time) during which the light receiving unit of the ambient light sensor 240K operates in an idle state.

Figure 9:
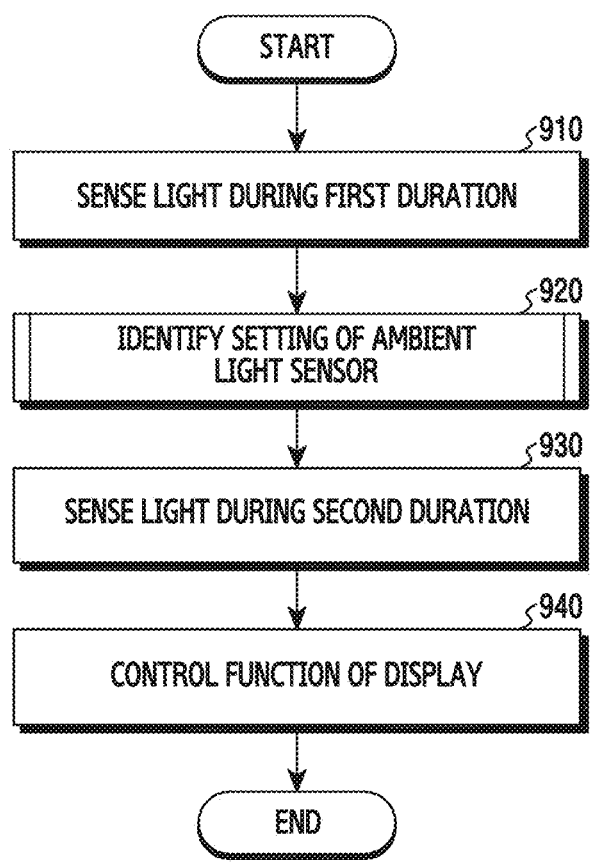
FIG. 9 illustrates an example of an operation for measuring ambient light in an electronic device according to various embodiments.

FIG. 9 illustrates an example of an operation for measuring light by an ambient light sensor according to various embodiments.

In operation 910, the processor 120 may control the ambient light sensor 240K of the electronic device 101 to sense ambient light (or ray) of the electronic device 101 during the first duration. The ambient light sensor 240K of the electronic device 101 may sense the ambient light of the electronic device 101 during the first duration.

In various embodiments, the ambient light sensor 240K may sense ambient light of the electronic device 101 during the first duration, in a state in which a screen displayed through the panel 262 is turned off. The ambient light sensor 240K receives light around the electronic device 101 in a state in which the screen is turned off and therefore, the light received to the ambient light sensor 240K may not include light scattered through the screen. In other words, the ambient light sensor 240K may receive the light around the electronic device 101 in a state of not being affected by the screen.

In various embodiments, the light may include light related with an environment in which the electronic device 101 is located. In some embodiments, the light may include light scattered from another electronic device around the electronic device 101. In other embodiments, the light may include visible light, infrared rays, ultraviolet rays, etc. The light is not limited to the aforementioned example, and may include a variety of light coming out from a light source.

In various embodiments, the processor 120 may receive information about the light through the ambient light sensor 240K, and identify received various information about the light. For example, the processor 120 may identify information related with a brightness and/or intensity of the collected light, a direction of the collected light, an incident angle of the collected light, a color of the collected light, a shadow of the collected light and/or a variation of the collected light.

In various embodiments, in response to the screen displayed through the panel 262 maintaining a turn-off state, the ambient light sensor 240K may continuously receive light around the electronic device 101.

In various embodiments, in response to the screen displayed through the panel 262 being turned off, other components included in the display 260 may operate in an activated state. For example, in response to a plurality of elements within the panel 262 operating in an inactive state, the touch panel 252 included in the display 260 may operate in an active state.

In various embodiments, the ambient light sensor 240K may operate based on a designated cycle. The designated cycle may include an active duration during which the ambient light sensor 240K operates in an active state, and an inactive duration during which the ambient light sensor 240K operates in an inactive state.

In various embodiments, a cycle of the ambient light sensor 240K may be configured differently according to the setting of the ambient light sensor 240K. In some embodiments, in response to the setting of the ambient light sensor 240K being the first configuration, the cycle of the ambient light sensor 240K may include the active duration corresponding to the first duration of time and the inactive duration having a shorter length than the first duration of time. For example, a length of the active duration may be 30 milliseconds (ms), and a length of the inactive duration may be 1 ms. In other some embodiments, in response to the setting of the ambient light sensor 240K being the second configuration, the cycle of the ambient light sensor 240K may include an active duration corresponding to a second duration of time and an inactive duration having a shorter length than the second duration of time. For example, the length of the active duration may be 1 ms, and the length of the inactive duration may be 1 ms. In response to the setting of the ambient light sensor 240K being the second configuration, the second duration may include the cycle of the ambient light sensor 240K in plural. In other words, the length of the second duration of time may be a multiple of the cycle of the ambient light sensor 240K. In response to the ambient light sensor 240K operating in the second configuration, the ambient light sensor 240K may repeatedly perform an operation of receiving light and an operation of not receiving light.

In various embodiments, the ambient light sensor 240K may sense light around the electronic device 101 through the light receiving unit 612. Through the sensing, the light receiving unit 612 may provide analog data about the light. In some embodiments, the light receiving unit 612 may transmit the provided analog data to the ADC 614. The ADC 614 may receive the analog data. The ADC 614 may provide digital data converted from the analog data.

In various embodiments, the digital data may be transmitted to the sensor hub 242. The processor 120 may identify an illuminance of light around the electronic device 101, based on the received digital data.

In operation 920, the processor 120 may identify the setting of the ambient light sensor 240K, based on the illuminance of light received during the first duration, in a state in which the display 260 is turned off.

The processor 120 may identify the setting of the ambient light sensor 240K as the second configuration of receiving light during the second duration of time, based on that the display 260 operates in an active state and the illuminance of light around the electronic device 101 satisfies a designated condition. The designated condition may be related with a level of the illuminance of light around the electronic device 101 received during the first duration. For example, in response to the display 260 operating in an active state, and the illuminance measured in operation 910 being less than a reference illuminance, the processor 120 may identify the setting of the ambient light sensor 240K as the second configuration. The ambient light sensor 240K operating in the second configuration may receive light during a plurality of active durations included in the second duration, and stop receiving light in a plurality of inactive durations included in the second duration of time. In other words, the ambient light sensor 240K operating in the second configuration may repeat and perform, at many times, during the second duration of time, an operation of receiving light during an active duration and an operation of stopping receiving light during an inactive duration. In some embodiments, an integration of the plurality of active durations included in the second duration of time may correspond to a duration of time of receiving light around the electronic device 101 from the first duration. By receiving light around the electronic device 101 during the plurality of active durations which have a length corresponding to the duration of time receiving light around the electronic device 101 from the first duration, the ambient light sensor 240K may secure a reliability of the measured illuminance.

In various embodiments, the processor 120 may identify the setting of the ambient light sensor 240K to receive light during the third duration of time, based on that the display 260 operates in the active state and the illuminance of light around the electronic device 101 does not satisfy the designated condition. For example, in response to the display 260 operating in the active state, and the illuminance measured in operation 910 being equal to or being greater than the reference illuminance, the processor 120 may identify the setting of the ambient light sensor 240K as the third configuration. In accordance with embodiments, the third duration of time may correspond to various durations of time. The various durations of time may be a previously designated value. For example, the third duration of time may correspond to a duration of time of measuring light around the electronic device 101 during the first duration. For another example, the third duration of time may not correspond to a duration of time of measuring light around the electronic device 101 during the first duration. The third duration of time may correspond to a duration longer or shorter than a duration of time of measuring light around the electronic device 101 during the first duration.

In various embodiments, the processor 120 may change the setting of the ambient light sensor 240K, based on information related with a state of a screen displayed through the panel 262. For example, in response to a state of the panel 262 converting from an idle state (or inactive state) into an active state, the processor 120 may change the setting of the ambient light sensor 240K from the first configuration to the second configuration or from the first configuration to the third configuration.

In various embodiments, in response to receiving a state signal from the panel 262 through the signal pin 616 and the signal pin 626, the processor 120 may identify an operation timing of the ambient light sensor 240K. For example, the processor 120 may identify an activation initiation timing of the ambient light sensor 240K as a reception timing of the state signal. The processor 120 may control the ambient light sensor 240K to receive light around the electronic device 101 during a duration (e.g. the second duration of time or the third duration of time) corresponding to the setting of the ambient light sensor 240K from the identified initiation timing. For another example, the processor 120 may identify the operation timing of the ambient light sensor 240K as a timing elapsing a designated duration from the reception timing of the state signal. The designated duration may be related with a duration for which one or more elements around the ambient light sensor 240K among a plurality of elements within the panel 262 are not activated. The designated duration may be used for identifying a duration for which light scattered from the plurality of elements within the panel 262 has less influence on the ambient light sensor 240K. The designated duration may be identified based on an active timing of one or more elements (e.g., one or more elements included within a specified scanning line) spaced apart less than a reference distance from the ambient light sensor 240K. The designated duration may be related with distances between a position in which the ambient light sensor 240K is disposed and positions of one or more elements within the panel 262 used for providing the state signal. A detailed description related with this will be made later through FIG. 11.

In some embodiments, the processor 120 may identify a timing of initiating an operation of the ambient light sensor 240K, based on a gap of a respective plurality of scanning lines within the panel 262, an emitting duration of a specified scanning line among the plurality of scanning lines, a position of the ambient light sensor 240K, and/or a size of the ambient light sensor 240K. In other some embodiments, the processor 120 may identify a timing of initiating an operation of the ambient light sensor 240K through the sensor hub 242. A detailed description related with this will be made later through FIG. 14 to FIG. 16.

In operation 930, the ambient light sensor 240K may sense light around the electronic device 101 during the second duration, based at least in part on the identified setting of the ambient light sensor 240K.

In various embodiments, in response to the illuminance of the light sensed through operation 910 being equal to or greater than the designated value, in operation 920, the processor 120 may identify the setting of the ambient light sensor 240K as the third configuration (or a configuration mode, a sensing mode, or a setting mode). The processor 120 may control the ambient light sensor 240K to sense light during the third duration of time during the second duration. For example, a length of the third duration of time may correspond to a length of a duration of time of measuring light around the electronic device 101 during the first duration.

In various embodiments, in response to the illuminance of the light sensed through operation 910 being less than the designated value, in operation 920, the processor 120 may change the setting of the ambient light sensor 240K into the second configuration. The processor 120 may control the ambient light sensor 240K to sense light during the third duration of time, during the second duration. The ambient light sensor 240K may measure light around the electronic device 101 during the second duration of time during the second duration. For example, the second duration of time may include a plurality of active durations (e.g., 30 in number) having a length of 1 ms and a plurality of inactive durations configured between the plurality of active durations and having a length of 1 ms. An integration of the plurality of active durations may correspond to the first duration of the first configuration. In some embodiments, the processor 120 may control the ambient light sensor 240K to stop an operation of sensing light after a designated duration elapses from the second duration.

In various embodiments, the panel 262 may display a screen, based on an operation of repeating an active duration and inactive duration of the panel 262, in a state in which the display 260 is activated. An active duration of the second duration of time may correspond to the inactive duration of the panel 262. An inactive duration of the second duration of time may correspond to the active duration of the panel 262. That is, the ambient light sensor 240K may repeat the inactive duration and the active duration, based on an operation in which the panel 262 repeats the active duration and the inactive duration for the sake of the displaying of the screen. The ambient light sensor 240K may sense light around the electronic device 101, based on the repeated active durations, and identify an illuminance related with the light.

In various embodiments, information about the light sensed by the ambient light sensor 240K may be provided to the processor 120. The processor 120 may identify an illuminance of the light, based on the information about the light. In some embodiments, the information about light sensed by the ambient light sensor 240K may be provided to the processor 120 through the sensor hub 242.

In operation 940, the processor 120 may control a function of the display 260, based on the information about the illuminance. The processor 120 may be provided with the information about the illuminance from the sensor hub 242. The processor 120 may identify a luminance (or brightness) outputted through the panel 262, based on at least in part on the provided information about the illuminance. For example, the processor 120 may identify the luminance as a value corresponding to the illuminance.

The processor 120 may provide information about the identified luminance to the display 260. In various embodiments, the processor 120 may provide the information about the identified luminance to the DDI 268 of the display 260. The information about the identified luminance may be used for controlling the setting of the display 260 or the setting of the panel 262 of the display 260. For example, the information about the identified luminance may be control information for controlling a brightness of a screen outputted through the panel 262.

In various embodiments, the processor 120 may identify a luminance of a screen that is being displayed (i.e., a screen that is currently being displayed) through the panel 262. The processor 120 may identify whether to change the luminance of the screen that is being displayed through the panel 262, based on the information about the identified luminance and the illuminance received through the sensor hub 242. For example, in response to it being identified that a brightness of light around the electronic device 101 is greater than a brightness of the screen, the processor 120 may control the panel 262 so as to increase the brightness of the screen. Through this operation, the panel 262 may provide a screen having a high visibility.

Figure 10:
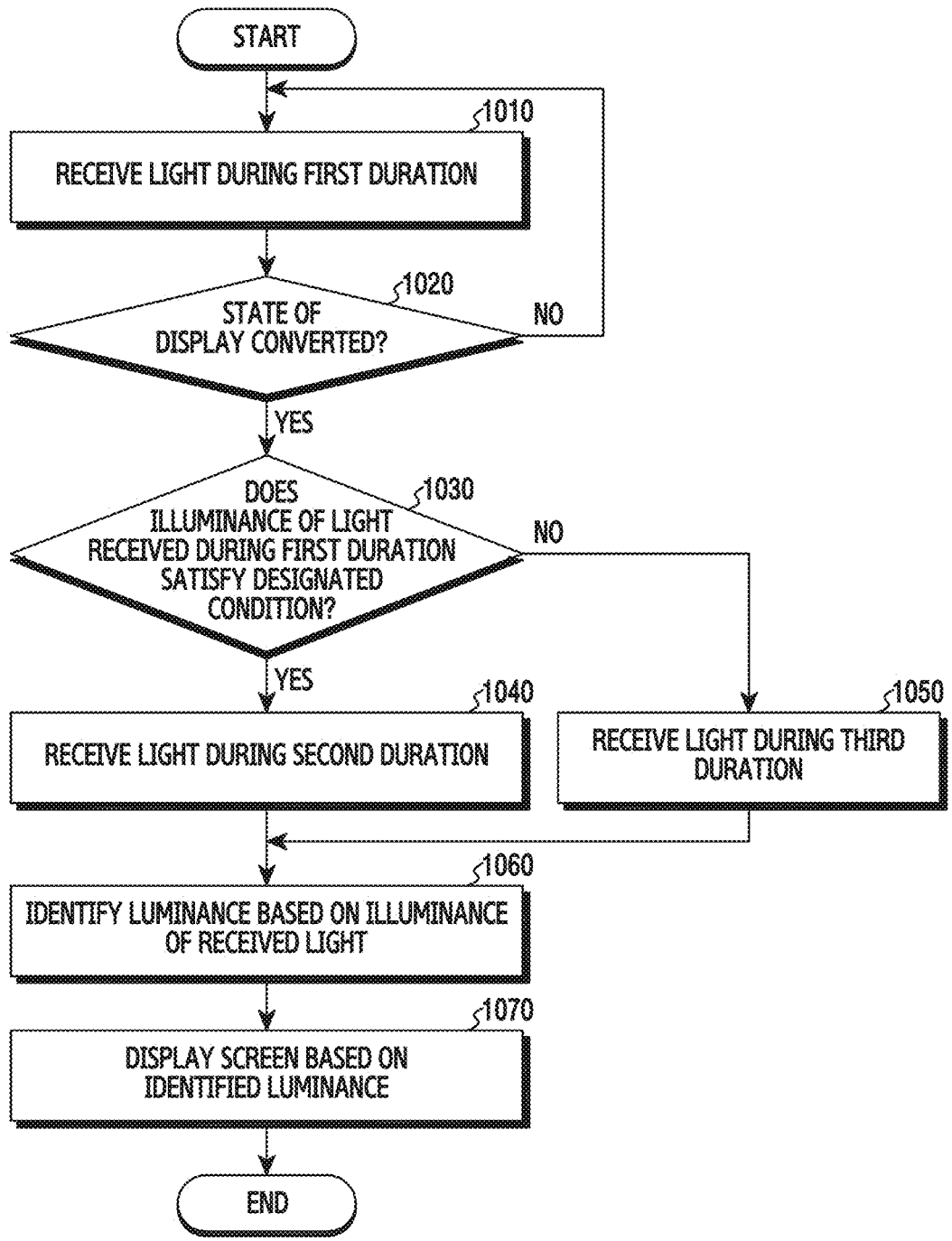
FIG. 10 illustrates an example of an operation for measuring light around an electronic device according to a state of a display included in the electronic device according to various embodiments.

FIG. 10 illustrates another example of an operation for measuring light around an electronic device according to various embodiments.

Referring to FIG. 10, in operation 1010, the ambient light sensor 240K of the electronic device 101 may receive ambient light of the electronic device 101 during a first duration.

In various embodiments, the ambient light sensor 240K may receive the ambient light (or rays) of the electronic device 101 during the first duration, in a state in which the panel 262 of the display 260 is turned off. The ambient light sensor 240K may receive light around the electronic device 101 in a state of not being affected by the panel 262. For example, the ambient light sensor 240K may receive light around the electronic device 101 during the first duration having a length of 30 ms, in a state in which the panel 262 is turned off. The light may include information related with an environment in which the electronic device 101 is located. The information may include information related with a brightness and/or intensity of the received light, a reception direction of the light, an incident angle of the received light, a color of the received light, a shadow of the received light and/or a change of the received light.

In various embodiments, the information may be transmitted from the ambient light sensor 240K to the ADC 614. The ADC 614 may convert information having an analog format into digital data having a digital format. The ADC 614 may transmit the digital data to the sensor hub 242. The processor 120 may receive information related with the light. The processor 120 may identify an illuminance of the light, based on the received information related with the light. The processor 120 may identify the illuminance of the light received during the first duration, as a first illuminance. In some embodiments, the sensor hub 242 may replace and perform at least part of an operation related with the light that the processor 120 performs.

In operation 1020, the processor 120 may identify whether a state of the panel 262 is converted. The processor 120 may identify whether the panel 262 is converted from a turn-off state (or idle state) to a turn-on state. The turn-off state of the panel 262 may include a state in which a screen is not displayed through the panel 262. The turn-on state of the panel 262 may include a state in which the screen is displayed through the panel 262. The panel 262 may display the screen through an operation in which a plurality of elements included in the panel 262 repeat an activated state and an inactivated state. In some embodiments, the processor 120 may identify the state of the panel 262 through the sensor hub 242.

In various embodiments, the processor 120 may identify the state of the panel 262, by monitoring a signal inputted or outputted to the panel 262. The processor 120 may provide the sensor hub 242 with information related with the state of the panel 262. The sensor hub 242 may identify whether the state of the panel 262 has been converted, based on the provided information related with the state of the panel 262.

In other some embodiments, the DDI 268 of the display 260 may transmit a signal related with a state of the screen, to the signal pin 616 included in the ambient light sensor 240K, through the signal pin 616 of the display 260. In response to the state of the screen displayed through the display 260 being converted, the DDI 268 may transmit the signal related with the state of the screen, to the signal pin 616. For example, the signal related with the state of the screen may be a state signal. The signal related with the state of the screen may indicate information for indicating the state of the screen (e.g., data for indicating that one or more elements within the panel 262 are activated, or data for indicating that a specified scanning line within the panel 262 is activated). The panel 262 may include one or more scanning lines which may affect the ambient light sensor 240K. In response to states of the one or more scanning lines being changed, the DDI 268 may identify the states of the scanning lines. The DDI 268 may provide a signal related with the states of the one or more scanning lines (e.g., a state signal related with the one or more scanning lines), to the processor 120. In some embodiments, the scanning lines may be arrayed in a Y-axis direction. For example, in response to a change of a state of a scanning line (or any scanning line) that is at the uppermost end of the scanning lines, the DDI 268 may provide the signal related with the state of the screen, to the processor 120. The processor 120 may identify whether the state of the panel 262 is converted, based on whether the processor 120 receives the signal related with the state of the screen. For another example, the DDI 268 may provide the signal related with the state of the screen, to the processor 120, through the sensor hub 242. The sensor hub 242 may replace and perform at least part of an operation of the processor 120.

In response to the state of the panel 262 being maintained (or in response to the state of the panel 262 not being converted), the ambient light sensor 240K may continuously perform operation 1010. For example, in response to the state of the panel 262 being maintained as a turn-off state, the processor 120 may control the ambient light sensor 240K to perform operation 1010. Unlike this, in response to the state of the panel 262 being converted from the turn-off state to the turn-on state, the sensor hub 242 may perform operation 1030.

In operation 1030, in response to the state of the panel 262 being converted into the turn-on state, the processor 120 may identify whether the illuminance of the light received during the first duration satisfies a designated condition. In various embodiments, the sensor hub 242 may receive information about the light received during the first duration, and may identify the illuminance of the light, based on the received information. For example, the sensor hub 242 may compare the identified illuminance and a reference illuminance. The reference illuminance may be stored in the electronic device 101 (or the memory 130 or 230). In some embodiments, the reference illuminance may be a fixed value. In other some embodiments, the reference illuminance may be changed adaptively according to one or more of an environment in which the electronic device 101 is located or a state of the electronic device 101 as well.

In various embodiments, while the panel 262 operates in a turn-on state, the panel 262 may display a screen, based on repeating an activated state and an inactivated state. In some embodiments, the panel 262 may include one or more scanning lines. While the panel 262 operates in the turn-on state, the one or more scanning lines may display the screen, based on repeating the activated state and the inactivated state.

In various embodiments, the processor 120 may control the ambient light sensor 240K to change the setting of the ambient light sensor 240K (or a duration during which the ambient light sensor 240K receives light), based on the comparison result. For example, the processor 120 may control the ambient light sensor 240K to operate in the second configuration, or control the ambient light sensor 240K to receive light during a second duration including a plurality of activated durations and a plurality of inactivated durations. In other some embodiments, on the basis of the comparison result, the processor 120 may control the ambient light sensor 240K to change the setting of the ambient light sensor 240K (or a duration during which the ambient light sensor 240K receives (or senses) light). For example, the processor 120 may control the ambient light sensor 240K to operate in the third configuration, or control the ambient light sensor 240K to receive light during a third duration having a length corresponding to the first duration.

In response to the illuminance of the light received during the first duration of time satisfying the designated condition, the ambient light sensor 240K may perform operation 1040. For example, in response to the illuminance of the light received during the first duration of time satisfying the designated condition, the processor 120 may control the ambient light sensor 240K to perform operation 1040. Unlike this, in response to the illuminance of the light received during the first duration of time not satisfying the designated condition, the ambient light sensor 240K may perform operation 1050. For example, in response to the illuminance of the light received during the first duration of time not satisfying the designated condition, the processor 120 may control the ambient light sensor 240K to perform operation 1050.

In operation 1040, in response to the illuminance of the light received during the first duration of time satisfying the designated condition, the ambient light sensor 240K may receive light during a second duration of time. The second duration of time may include one or more first intervals (or part of the second duration of time) for which the light receiving unit 612 of the ambient light sensor 240K operates in an active state, and one or more second intervals (or another part of the second duration of time) for which the light receiving unit 612 of the ambient light sensor 240K operates in an idle state (or inactive state). An integration of the one or more first intervals may correspond to the first duration. The second intervals may be configured between the first intervals. In other words, the ambient light sensor 240K may repeatedly perform an operation of receiving light at a first interval during the second duration and an operation of stopping receiving light at a second interval. An integration of the first interval and the second interval may be equal to or be longer than the first duration of time.

The ambient light sensor 240K may transmit information about the light received during the second duration, to the sensor hub 242 through the ADC 614. The sensor hub 242 may receive the information about the light. The sensor hub 242 may identify a second illuminance, based on the received information. The sensor hub 242 may transmit information about the identified second illuminance to the processor 120. The processor 120 may receive the information about the second illuminance.

In various embodiments, the processor 120 may identify a timing (or an operation initiation timing) for initiating an operation in which the ambient light sensor 240K receives light, based on the information (or state signal) related with the state of the screen. The information related with the state of the screen may be received in operation 1020, or be received in response to a state of the display 260 being changed. The processor 120 may control the ambient light sensor 240K to receive light around the electronic device 101 during a second duration, based on the identified timing. For example, the ambient light sensor 240K may receive the light during the second duration from the identified timing. For another example, the ambient light sensor 240K may receive the light during the second duration from a timing elapsing a designated duration from the identified timing. An initiation timing of the first interval may correspond to the identified timing.

In various embodiments, the state signal may be received in response to the first scanning line among one or more scanning lines affecting the ambient light sensor 240K being activated (or turned on). The processor 120 may store information related with a timing at which the scanning lines are turned off, based on the configuration of the electronic device 101. The processor 120 may identify a timing at which one or more scanning lines affecting the ambient light sensor 240K are turned off, based on the state signal and the information about the timing at which the scanning lines are turned off. On the basis of the identified timing, the processor 120 may identify a timing at which the ambient light sensor 240K initiates an operation so as to receive light around the electronic device 101. In response to the identified timing, the ambient light sensor 240K may receive light during a second duration. The second duration may include one or more first intervals for which the light receiving unit 612 of the ambient light sensor 240K operates in an active state. An initiation timing of the first interval may correspond to the timing of initiating the operation. In some embodiments, the sensor hub 242 may replace at least part of an operation of the processor 120.

In operation 1050, in response to the illuminance of the light received during the first duration of time not satisfying the designated condition, the ambient light sensor 240K may receive light during a third duration of time. For example, the sensor hub 242 may identify that the illuminance (or first illuminance) of the light received during the first duration of time is less than the reference illuminance. In response to the identifying, the processor 120 may control the ambient light sensor 240K to receive the light during the third duration of time. In some embodiments, the third duration of time may correspond to the first duration of time. The ambient light sensor 240K may provide information about the light received during the third duration of time, to the sensor hub 242. The processor 120 may receive the information about the received light. The processor 120 may identify a third illuminance, based on the received information. The processor 120 may receive information about the illuminance.

In operation 1060, the processor 120 may identify a luminance of a screen displayed through the panel 262 of the display 260, based on an illuminance of the received light.

In various embodiments, the processor 120 may identify the luminance of the screen outputted through the panel 262, based on a second illuminance received through operation 1040. The luminance of the screen may correspond to the second illuminance. For example, in response to the second illuminance being greater than an illuminance corresponding to a current luminance of the screen, the processor 120 may identify the luminance of the screen as a value higher than the current luminance. For another example, in response to the second illuminance being less than the illuminance corresponding to the current luminance of the screen, the processor 120 may identify the luminance of the screen as a value lower than the current luminance. For further example, in response to the second illuminance being equal (or corresponding) to the illuminance corresponding to the current luminance of the screen, the processor 120 may maintain the luminance of the screen as the current luminance.

In some embodiments, the processor 120 may identify the luminance of the screen outputted through the display 260, based on the third illuminance provided through operation 1050. The identified luminance of the screen may correspond to the third illuminance. For example, in response to the third illuminance being greater than the illuminance corresponding to the current luminance of the screen, the processor 120 may identify the luminance of the screen as the value higher than the current luminance. For another example, in response to the third illuminance being less than the illuminance corresponding to the current luminance of the screen, the processor 120 may identify the luminance of the screen as the value lower than the current luminance. For further example, in response to the third illuminance being equal (or corresponding) to the illuminance corresponding to the luminance of the screen, the processor 120 may maintain the luminance of the screen as the current luminance.

In operation 1070, the processor 120 may display the screen outputted through the panel 262 of the display 260, based on the identified luminance. The processor 120 may transmit information about the identified luminance to the DDI 268 included in the display 260. The DDI 268 may control a brightness of the screen displayed through the panel 262, based on the received information about the luminance.

As described above, the electronic device 101 according to various embodiments may identify the setting of the ambient light sensor 240K, based on a state of the panel 262 included in the display 260 and a state of light of an environment in which the electronic device 101 is located. By controlling the ambient light sensor 240K based on the identified setting, the electronic device 101 may acquire information related with the light of the environment in which the electronic device 101 is located. By changing the setting of the ambient light sensor 240K adaptively based on the state of the panel 262 and the state of light of the environment in which the electronic device 101 is located, the electronic device 101 may decrease an illuminance measurement error which may occur due to light caused by the panel 262.

Figure 11:
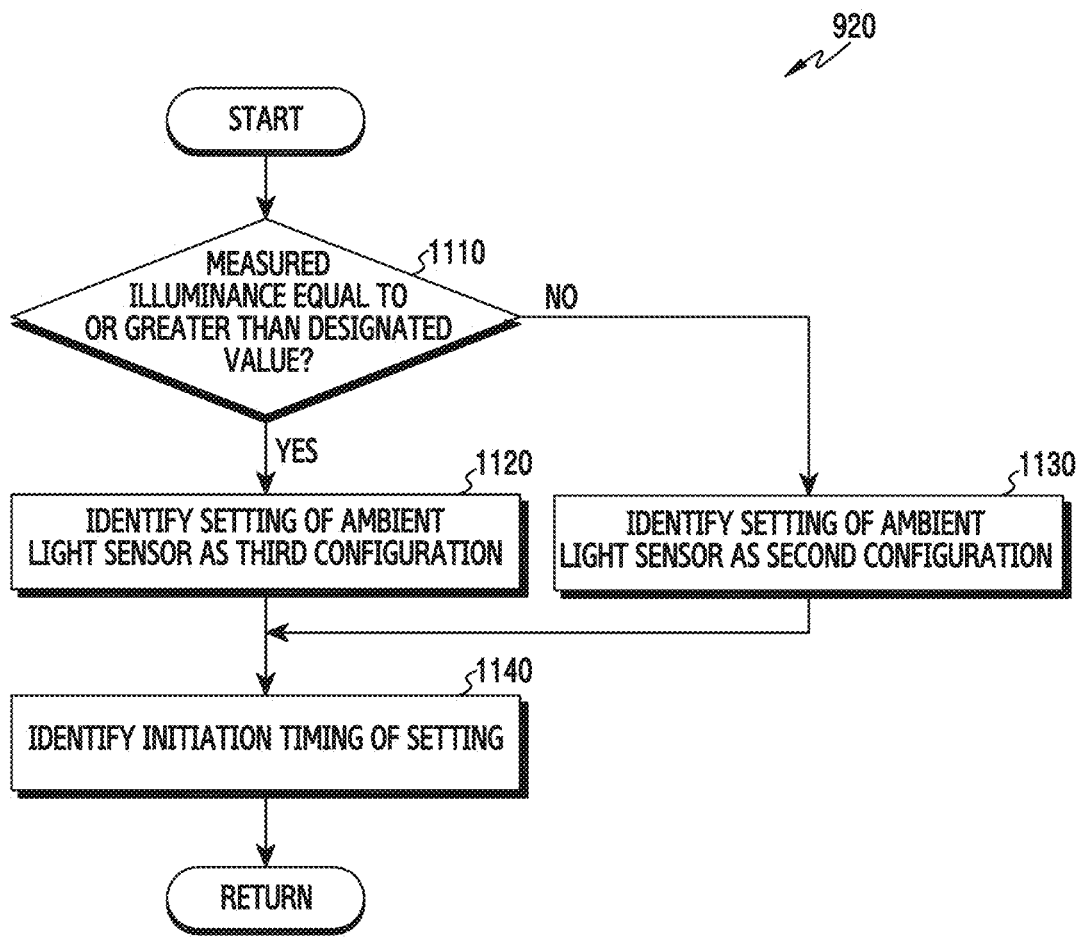
FIG. 11 illustrates an example of an operation for identifying the setting of an ambient light sensor in an electronic device according to various embodiments.

FIG. 11 illustrates an example of an operation for identifying the setting of an ambient light sensor included in an electronic device according to various embodiments. FIG. 11 illustrates operation 920 of FIG. 9 in more detail.

Referring to FIG. 11, in operation 1110, the processor 120 may identify whether an illuminance of light measured through the ambient light sensor 240K is equal to or is greater than a designated value (or a threshold value, a designated illuminance or a predetermined illuminance).

In various embodiments, the illuminance may be a value identified through the ambient light sensor 240K. The illuminance may correspond to information about light (or rays) around the electronic device 101. In some embodiments, the designated value may be identified based on a degree of influence that an emitting state of a screen displayed through the panel 262 has on the ambient light sensor 240K. The designated value may be a value preset to the sensor hub 242. For example, the processor 120 may identify whether an illuminance measured through the ambient light sensor 240K is equal to or is greater than 700 lux (lx). In response to the measured illuminance being equal to or being greater than the designated value, the processor 120 may perform operation 1120. Unlike this, in response to the measured illuminance being less than the designated value, the processor 120 may perform operation 1130.

In operation 1120, the processor 120 may identify an operation mode of the sensor hub 242 as the third configuration (i.e., a configuration mode, a sensing mode or a setting mode). A detailed description of the third configuration will be made through FIG. 12A and FIG. 12B.

In various embodiments, in response to the setting of the ambient light sensor 240K being the third configuration, the ambient light sensor 240K may receive light around the electronic device 101 during a third duration. The ambient light sensor 240K may perform the operation of receiving the light irrespective of a state of the display 260 (e.g., an on/off state of the display 260). In some embodiments, the third duration may correspond to the first duration of operation 910 of FIG. 9. In other words, in response to the measured illuminance being equal to or being greater than the designated value, the ambient light sensor 240K may maintain an operation of receiving light around the electronic device 101 during the first duration.

In other some embodiments, the third duration may be different from the first duration of operation 1010 of FIG. 10. For example, the ambient light sensor 240K may receive light around the electronic device 101 during the third duration (e.g., 40 ms) different from the first duration (e.g., a length of 30 ms).

In operation 1130, in response to the measured illuminance being less than the designated value, the processor 120 may identify a mode of the ambient light sensor 240K as a second mode.

In various embodiments, in response to the ambient light sensor 240K operating in the second mode, the ambient light sensor 240K may receive light during a second duration longer than the first duration being a duration of receiving light in the first mode. The second duration may include one or more first intervals for which the light receiving unit 612 operates in an active state and one or more second intervals for which the light receiving unit 612 operates in an idle state.

In operation 1140, the processor 120 may identify an initiation timing of the mode identified through operation 1120 or operation 1130. The initiation timing may be identified, based on a state signal transmitted from the signal pin 626 of the display 260 to the signal pin 616 of the ambient light sensor 240K. The state signal may indicate information related with an active state and/or inactive state of the panel 262. In a state in which the display 260 is turned on, the panel 262 may repeat an active state and an inactive state so as to display a screen. The state signal may indicate a timing at which the panel 262 operates in the active state. The state signal may be transmitted from the signal pin 626 to the signal pin 616 at the timing at which the panel 262 operates in the active state.

A detailed description of the second configuration will be made later through FIG. 13A, FIG. 13B, FIG. 14, and FIG. 15.

Figure 12A:
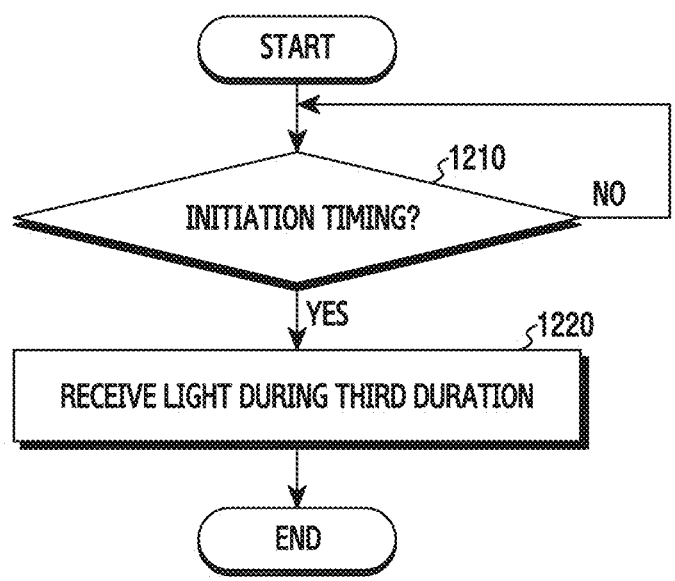
FIG. 12A illustrates an example of an operation for identifying the setting of an ambient light sensor included in an electronic device according to various embodiments.

FIG. 12A illustrates an example of an operation of an ambient light sensor included in an electronic device according to various embodiments.

Referring to FIG. 12A, in operation 1210, the processor 120 may identify a timing at which the ambient light sensor 240K initiates an operation for receiving light (rays) around the electronic device 101. The processor 120 may identify whether to initiate the operation for receiving the light, based on a state of the display 260. In some embodiments, by monitoring a timer for identifying an operation state of the ambient light sensor 240K, the processor 120 may identify whether to initiate the operation for receiving the light. In other some embodiments, the processor 120 may receive information or signal related to the state of the display 260 from the display 260 through the signal pin 616 included in the ambient light sensor 240K. The processor 120 may identify the operation initiation timing of the ambient light sensor 240K, based on the received information or signal. The processor 120 may identify whether to initiate the operation for receiving the light, based on the identified operation initiation timing. In further other some embodiments, the sensor hub 242 may replace and perform at least part of an operation of the processor 120.

In operation 1220, in response to identifying the initiating of the operation for receiving the light, the ambient light sensor 240K may receive light during a third duration. The third duration may correspond to a first duration of operation 1010 of FIG. 10. The third duration may be a designated value. For example, the third duration may be designated as 30 ms. In various embodiments, the processor 120 may receive information about the light from the ambient light sensor 240K, based on the received light. The processor 120 may identify an illuminance related with the light, based on the received information. In some embodiments, the sensor hub 242 may replace and perform at least part of an operation of the processor 120.

Figure 12B:
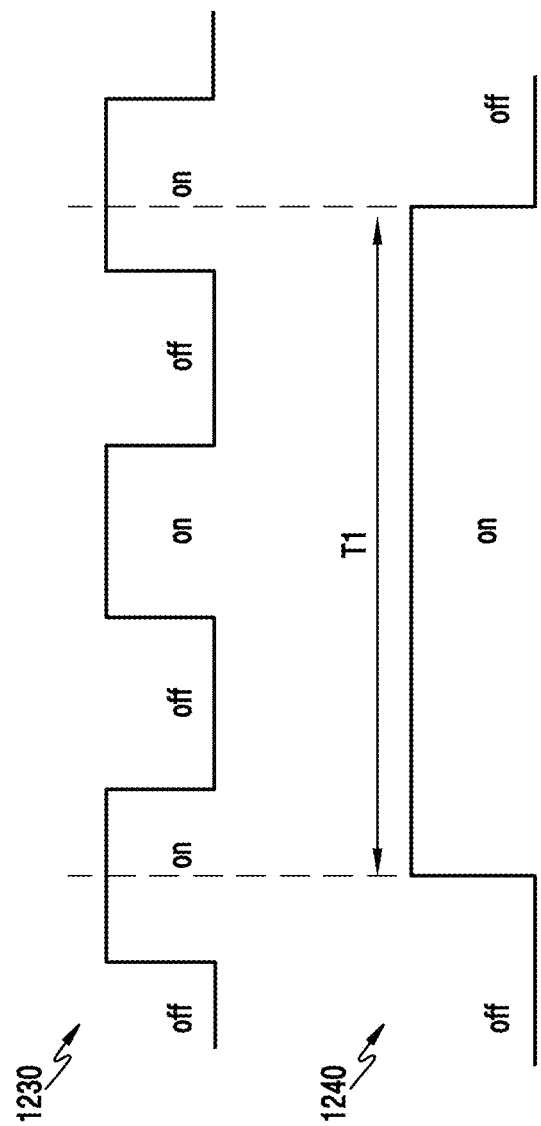
FIG. 12B illustrates an example of the setting of an ambient light sensor included in an electronic device according to various embodiments.

FIG. 12B illustrates an example of the setting of the ambient light sensor 240K included in an electronic device according to various embodiments.

In FIG. 12B, the setting of the ambient light sensor 240K may correspond to the first configuration or the third configuration.

Referring to FIG. 12B, graph 1230 may indicate a state of a screen displayed through the panel 262 of the display 260. Graph 1230 may indicate an operation in which a plurality of elements included in the panel 262 repeat an activated state and an inactivated state, in a state in which the panel 262 is turned on.

A horizontal axis of graph 1230 may indicate time, and a vertical axis of graph 1230 may indicate whether one or more elements among the plurality of elements included in the panel 262 operate in an active state.

Graph 1240 may indicate an operation state of the ambient light sensor 240K. A horizontal axis of graph 1240 may indicate time, and a vertical axis of graph 1240 may indicate whether the ambient light sensor 240K operates in an active state.

In graph 1240, a duration (T1) may indicate a duration for which the ambient light sensor 240K operates in a turn-on (active) state. For example, the duration (T1) may indicate an active duration. The ambient light sensor 240K operating in the first configuration or the third configuration may operate in the active state during the duration (T1) irrespective of a state of the panel 262 as indicated by graph 1230. In other words, the ambient light sensor 240K operating in the first configuration or the third configuration may receive light around the electronic device 101 irrespective of the state of the panel 262.

Figure 13A:
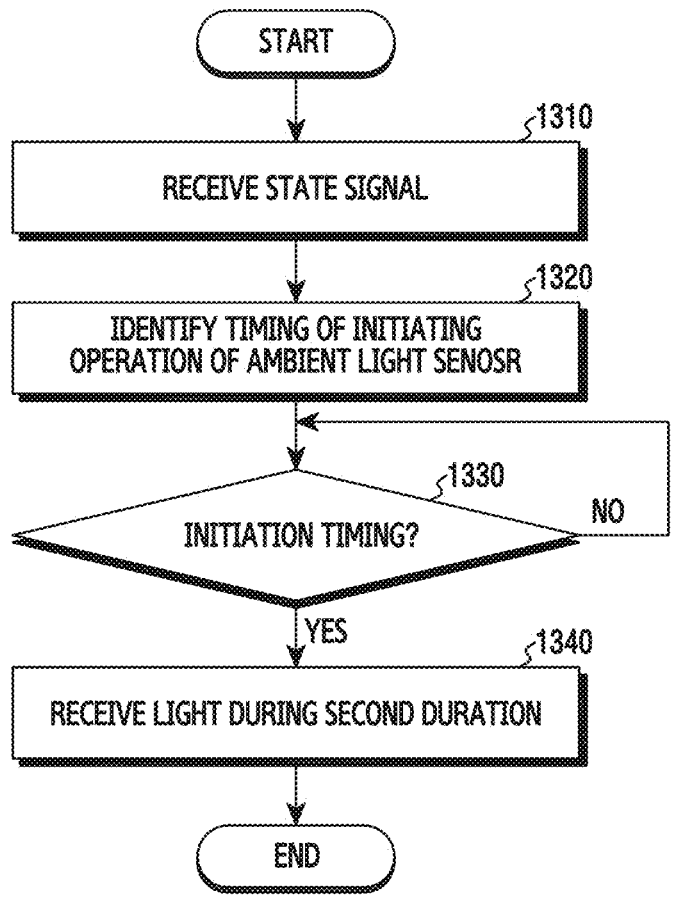
FIG. 13A illustrates another example of an operation for identifying the setting of an ambient light sensor included in an electronic device according to various embodiments.

FIG. 13A illustrates another example of an operation of the ambient light sensor 240K included in an electronic device according to various embodiments.

Referring to FIG. 13A, in operation 1310, the processor 120 may receive a state signal from the display 260. For example, the processor 120 may receive the state signal through the signal pins 616 and 626 included respectively in the ambient light sensor 240K and the display 260. In various embodiments, the state signal may include information related with a state of the display 260. For example, the state signal may indicate one or more of a state of a screen (e.g., ON/OFF of the screen) displayed through the panel 262 of the display 260 or an ON/OFF timing of the screen.

In various embodiments, the processor 120 may receive the state signal cyclically, or transmit or receive the state signal based on the occurrence of a specified event. For example, the processor 120 may receive the state signal in response to a specified scanning line within the panel 262 being activated (or inactivated) every specified cycle. The processor 120 may synchronize the ambient light sensor 240K and the display 260, based on the receiving of the state signal.

In operation 1320, the ambient light sensor 240K may identify a timing at which an operation of the ambient light sensor 240K will be initiated, based on the received state signal.

In various embodiments, the processor 120 may identify a timing at which a screen displayed through the panel 262 is turned on (or turned off), included in the received state signal. The processor 120 may identify a timing at which the screen is turned off, based on the identified timing. The processor 120 may identify an operation initiation timing at which an operation of the ambient light sensor 240K will be initiated, based on the timing at which the screen is turned off.

In various embodiments, the ambient light sensor 240K may operate in a state in which an interference of the display 260 is minimized (or decreased), through the receiving of the state signal. In other words, the electronic device 101 may secure an accuracy, reliability, etc. of an illuminance measured through the ambient light sensor 240K, through the state signal.

In operation 1330, the processor 120 may identify whether it has reached the initiation timing (or operation initiation timing) identified through operation 1320. The processor 120 may change the setting of the ambient light sensor 240K. In some embodiments, the sensor hub 242 may replace at least part of an operation of the processor 120. For example, the sensor hub 242 may change the setting of the ambient light sensor 240K.

In response to reaching the initiation timing, the processor 120 or the ambient light sensor 240K may perform operation 1340. In response to not reaching the initiation timing, the processor 120 or the ambient light sensor 240K may repeatedly perform operation 1330. In other words, in response to not reaching the initiation timing, the processor 120 or the ambient light sensor 240K may continuously monitor whether it reaches the initiation timing.

In operation 1340, the ambient light sensor 240K may receive light (or rays) around the electronic device 101 during the second duration.

In various embodiments, the second duration may include one or more first intervals for which the light receiving unit 612 operates in an active state and one or more second intervals for which the light receiving unit 612 operates in an idle state. The second intervals may be identified between the first intervals. The first interval of the second duration may correspond to a duration for which one or more scanning lines within a screen displayed through the panel 262 are turned off. The one or more scanning lines may be disposed in adjacent to the ambient light sensor 240K. An initiation timing of the second duration may correspond to a timing at which the one or more scanning lines are converted from an emitting state to a non-emitting state. An ending timing of the second duration may correspond to a timing at which states of the one or more scanning lines are converted from the non-emitting state to the emitting state. In some embodiments, the light receiving unit 612 may receive light around the electronic device 101, within a duration for which the one or more scanning lines are turned off. For example, the light receiving unit 612 may operate in the active state converted from the idle state within a duration for which the screen is turned off. The light receiving unit 612 may terminate (or stop) receiving light around the electronic device 101, within a duration for which the one or more scanning lines are turned on. For example, the light receiving unit 612 may operate in the idle state converted from the active state, within a duration for which the screen is turned on. In other words, by synchronizing an operation of the ambient light sensor 240K and an operation of the display 260 on the basis of the state signal, the processor 120 or the ambient light sensor 240K may control an active timing or inactive timing of the light receiving unit 612.

Figure 13B:
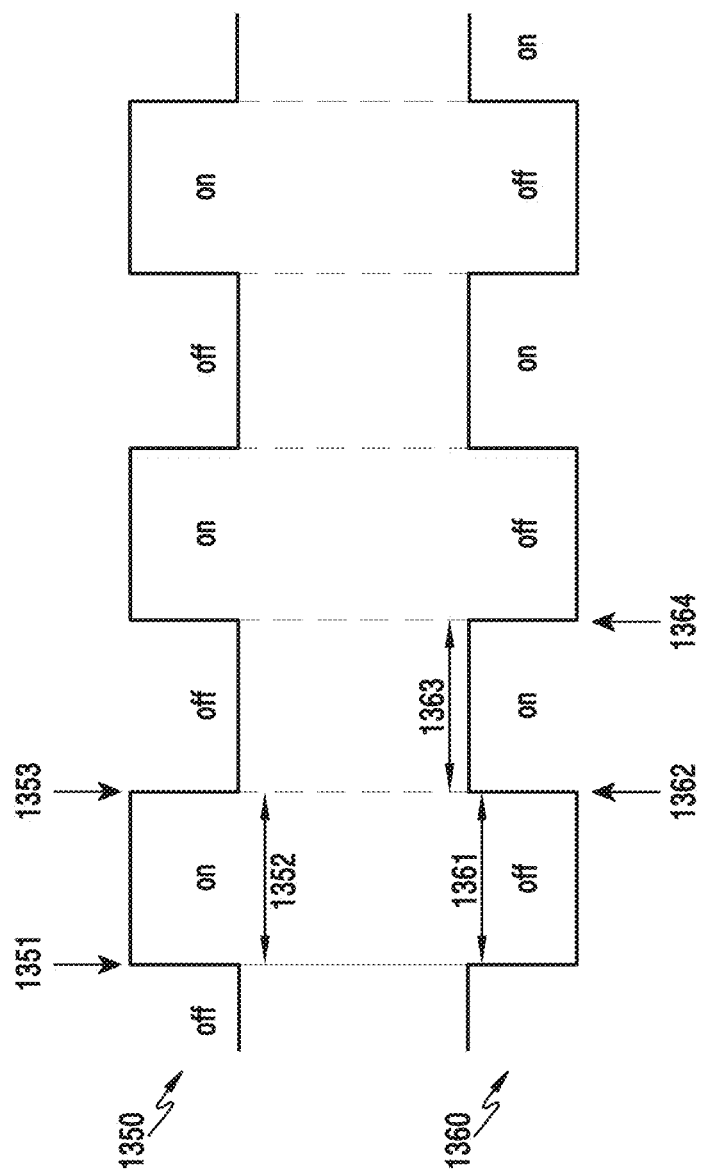
FIG. 13B illustrates another example of the setting of an ambient light sensor included in an electronic device according to various embodiments.

In various embodiments, the sensor hub 242 may replace and perform at least part of an operation that the processor 120 performs, in relation with FIG. 13B. The processor 120 may identify or process an operation related with the ambient light sensor 240K through the sensor hub 242.

FIG. 13B illustrates another example of the setting of the ambient light sensor 240K included in an electronic device according to various embodiments.

In FIG. 13B, the setting of the ambient light sensor 240K may correspond to the second configuration.

Referring to FIG. 13B, graph 1350 may indicate a state of a screen displayed through the panel 262 of the display 260. Graph 1350 may indicate an operation in which a plurality of elements included in the panel 262 repeat an activated state and an inactivated state, in a state in which the panel 262 is turned on. A horizontal axis of graph 1350 may indicate time, and a vertical axis of graph 1350 may indicate whether one or more elements among a plurality of elements included in the panel 262 or one or more scanning lines among a plurality of scanning lines included in the panel 262 operate in an active state.

Graph 1360 may indicate an operation state of the ambient light sensor 240K. A horizontal axis of graph 1360 may indicate time, and a vertical axis of graph 1360 may indicate whether the ambient light sensor 240K operates in an active state.

In graph 1350, in response to reaching a timing 1351, one or more elements or one or more scanning lines of the panel 262 may be converted into an active state. The one or more elements or the one or more scanning lines may operate in the active state during a duration 1352. In response to reaching a timing 1353 (or in response to a lapse of the duration 1352), the one or more elements or the one or more scanning lines may operate in an idle state. The one or more elements or the one or more scanning lines may repeatedly perform this operation.

In graph 1360, while the one or more elements or the one or more scanning lines operate in the active state, the ambient light sensor 240K may operate in the idle state (or inactive state). For example, the ambient light sensor 240K may operate in the idle state during a duration 1361. In other words, the ambient light sensor 240K may stop receiving light during the duration 1361.

In response to reaching the timing 1362, the ambient light sensor 240K may operate in the active state converted from the idle state. The ambient light sensor 240K may synchronize with the panel 262, based on a state signal received through the signal pin 626 and the signal pin 616 from the panel 262. On the basis of the synchronization, the ambient light sensor 240K may convert a state of the ambient light sensor 240K into the active state, at a timing at which the one or more elements or the one or more scanning lines are converted into the idle state. The ambient light sensor 240K may operate in the active state during a duration 1363. In response to reaching a timing 1364, the ambient light sensor 240K may operate in the idle state. Because the ambient light sensor 240K operates based on a cyclically received state signal, the ambient light sensor 240K may convert into the idle state at the timing 1364 that is a timing at which the one or more elements or the one or more scanning lines are converted into the active state. The ambient light sensor 240K may repeatedly perform this operation.

In various embodiments, the sensor hub 242 may replace and perform at least part of an operation that the processor 120 performs, in relation with FIG. 13B. The processor 120 may identify or process an operation related with the ambient light sensor 240K through the sensor hub 242.

Figure 14:
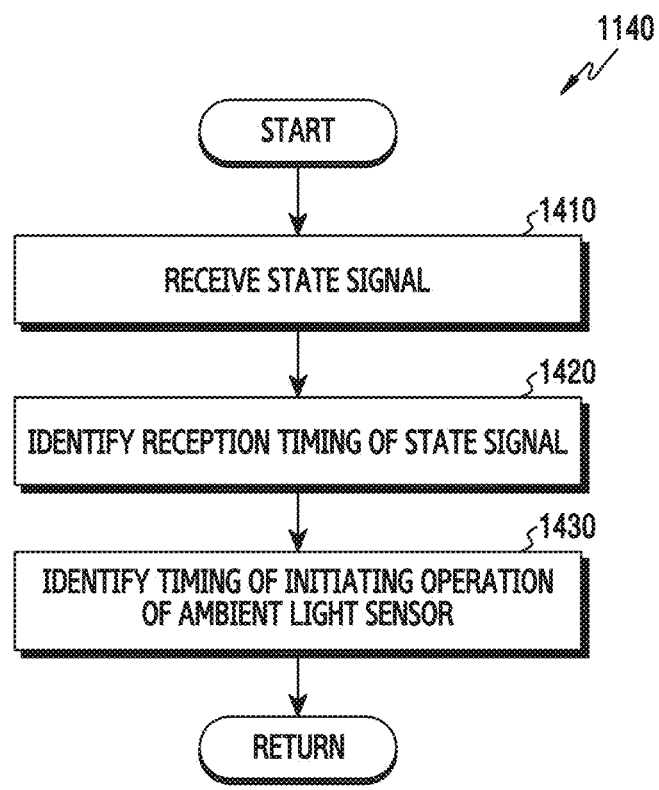
FIG. 14 illustrates an example of an operation for sensing light around an electronic device, based on a state signal according to various embodiments.

FIG. 14 illustrates an example of an operation of receiving light in an electronic device, based on a state signal according to various embodiments. FIG. 14 illustrates operation 1140 of FIG. 11 in more detail.

Referring to FIG. 14, in operation 1410, the sync pin 616 of the ambient light sensor 240K may receive a state signal from the display 260. The signal pin 616 may receive the state signal transmitted through the signal pin 626 from the panel 262 of the display 260.

In various embodiments, the state signal may include information about a state of a screen displayed through the panel 262 of the display 260. For example, the state signal may include information for indicating an ON/OFF timing of the screen.

In various embodiments, the electronic device 101 may include at least one scanning line. The state signal received through the signal pins 616 and 626 may include information related with the scanning line. For example, the state signal may be received at a timing at which the first scanning line positioned at the uppermost end of the electronic device 101 emits light. The scanning lines may emit light in sequence up to an nth row, in response to the uppermost end being the first row.

In various embodiments, a time gap between a timing at which the first row of the scanning lines emits light and a timing at which the second row of the scanning lines emits light may be denoted as a delay time. In some embodiments, the delay time may be different by the number of scanning lines. Also, the delay time may be different corresponding to a configuration of the electronic device, a system, a picture quality, etc. For example, in response to the number of scanning lines included in the electronic device being 2,960, the delay time may be about 5.6 micro seconds (μs). An ON/OFF cycle of the scanning line may be about 4.15 ms. The minimum duration of maintaining a state in which the scanning line is turned off may be about 1.45 ms.

In various embodiments, the state signal transmitted and/or received based on the signal pins 616 and 626 may include information related with the at least one element (e.g., pixel). The state signal may include information related with a timing at which at least one element included in the first scanning line positioned at the uppermost end of the electronic device 101 emits light.

In operation 1420, the processor 120 may identify a reception timing of the state signal. In various embodiments, the state signal may include information for indicating an emitting timing of the scanning line of the display 260. Through identifying the reception timing of the state signal, the processor 120 may identify that the first scanning line of the display 260 emits light (or an emitting timing of the first scanning line).

In operation 1430, the processor 120 may identify a timing of initiating an operation of the ambient light sensor 240K, based on the identified timing and/or the delay time of the scanning line. In some embodiments, the delay time of the scanning line may be previously designated based on a state of hardware of the electronic device 101.

In various embodiments, the processor 120 may convert a state of the ambient light sensor 240K from an inactive state to an active state, in response to a specified scanning line of a screen displayed through the panel 262 being turned off. In some embodiments, at least a part of a plurality of scanning lines included in the panel 262 of the display 260 may affect the ambient light sensor 240K. In response to the at least part of the plurality of scanning lines capable of affecting the ambient light sensor 240K being turned off, the processor 120 may convert the state of the ambient light sensor 240K from the inactive state to the active state. In other embodiments, the processor 120 may receive information about a timing at which the first scanning line among the plurality of scanning lines capable of affecting the ambient light sensor 240K is turned off, received through the signal pin 616. The processor 120 may identify a duration required until the plurality of scanning lines capable of affecting the ambient light sensor 240K are all turned off, based on the received information about the timing. On the basis of the required time, the processor 120 may change the state of the ambient light sensor 240K. For example, a total sum of the delay time related with the scanning lines affecting the ambient light sensor 240K may be about 0.05 seconds. In this embodiment, a timing at which the ambient light sensor 240K is turned on may be about 0.05 seconds after a timing at which the display 260 is turned off. The sum of the delay time may be calculated by a product of the number of scanning lines affecting the ambient light sensor and the delay time.

In various embodiments, the sensor hub 242 may replace and perform at least part of an operation that the processor 120 performs, in relation with FIG. 14.

Figure 15:
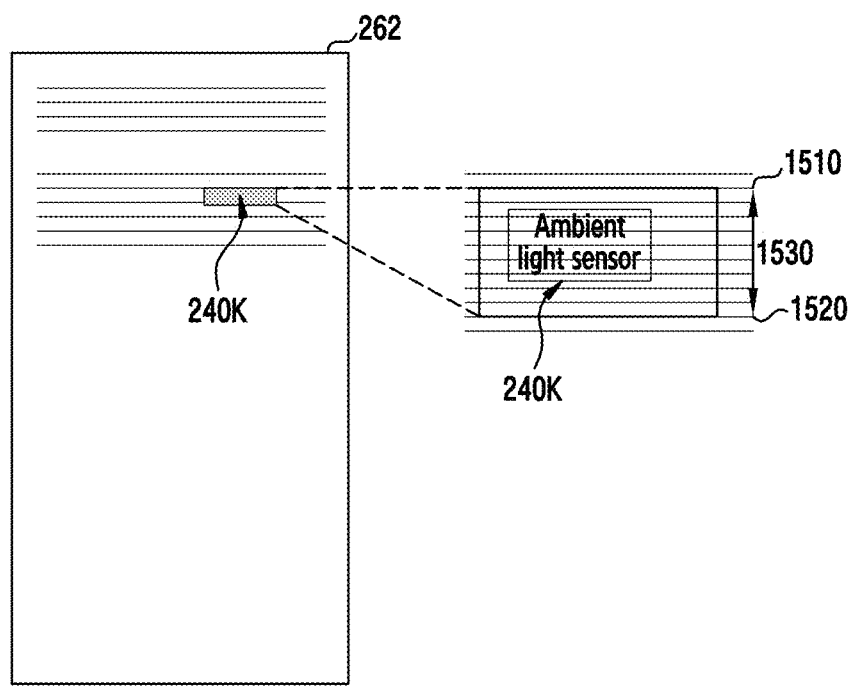
FIG. 15 illustrates an example of a scanning line and an ambient light sensor which are included in an electronic device according to various embodiments.

FIG. 15 illustrates an example of an operation of a scanning line and an ambient light sensor which are included in an electronic device according to various embodiments.

Referring to FIG. 15, the electronic device 101 may include the ambient light sensor 240K and at least one scanning line.

In various embodiments, a length 1530 may indicate a range of scanning lines affecting the ambient light sensor 240K. A scanning line 1510 may correspond to the first scanning line which is capable of affecting the ambient light sensor 240K. A scanning line 1520 may correspond to the last scanning line which is capable of affecting the ambient light sensor 240K.

In various embodiments, the signal pin 616 of the ambient light sensor 240K may receive information about a turn-on timing of the scanning line 1510 from the display 260. The information about the turn-on timing received through the signal pin 616 may be transmitted to the processor 120. The processor 120 may identify an activation timing of the ambient light sensor 240K, based on the received information about the turn-on timing. For example, the processor 120 may identify a turn-off timing of the scanning line 1510, a turn-on timing of the scanning line 1520, and/or a turn-off timing of the scanning line 1520, from the information about the turn-on timing of the scanning line 1510. In response to the turn-off timing of the scanning line 1520, the ambient light sensor 240K may be activated. In some embodiments, the processor 120 may perform an operation related with the scanning line through the sensor hub 242.

In various embodiments, the number of scanning lines affecting the ambient light sensor 240K may be different depending on a size of the ambient light sensor 240K. Information about the number of scanning lines which are turned off during about 1 ms in order for the ambient light sensor 240K to be activated 1 ms or longer so as to receive light (rays) around the electronic device 101 may be needed. The number of scanning lines turned off during about 1 ms may be identified based on Equation 1 below.

$$N = \frac{t_{off} - 2 \times t_{margin} - t_{on}}{t_{delay}} \quad \text{Equation 1}$$

In Equation 1, the N may refer the number of scanning lines turned off during 1 ms, the $t_{off}$ may refer a duration for which the display 260 is turned off, the $t_{on}$ may refer an integration time for which the ambient light sensor 240K should maintain a turn-on state so as to integrate information about light, the $t_{delay}$ may refer a delay time between respective scanning lines, and the $t_{margin}$ may refer an on/off timing margin of the display 260 and the ambient light sensor 240K. For example, the N may be determined to be 44, in response to the display 260 having 2,960 scanning lines, the $t_{margin}$ being 0.1 ms, the $t_{on}$ being 1 ms, the $t_{off}$ being about 1.45 ms, and the $t_{delay}$ being 5.6 µs. That is, in response to the size of the ambient light sensor 240K being smaller than a length of 44 scanning lines that are disposed in a Y axis, the ambient light sensor 240K may be activated about 1 ms or longer so as to receive light around the electronic device 101. The 44 scanning lines may be included in the length 1530. A method of identifying the size of the ambient light sensor 240K may be changed based on a resolution and size of the display 260, and even the size of the ambient light sensor 240K may be identified variously.

Figure 16:
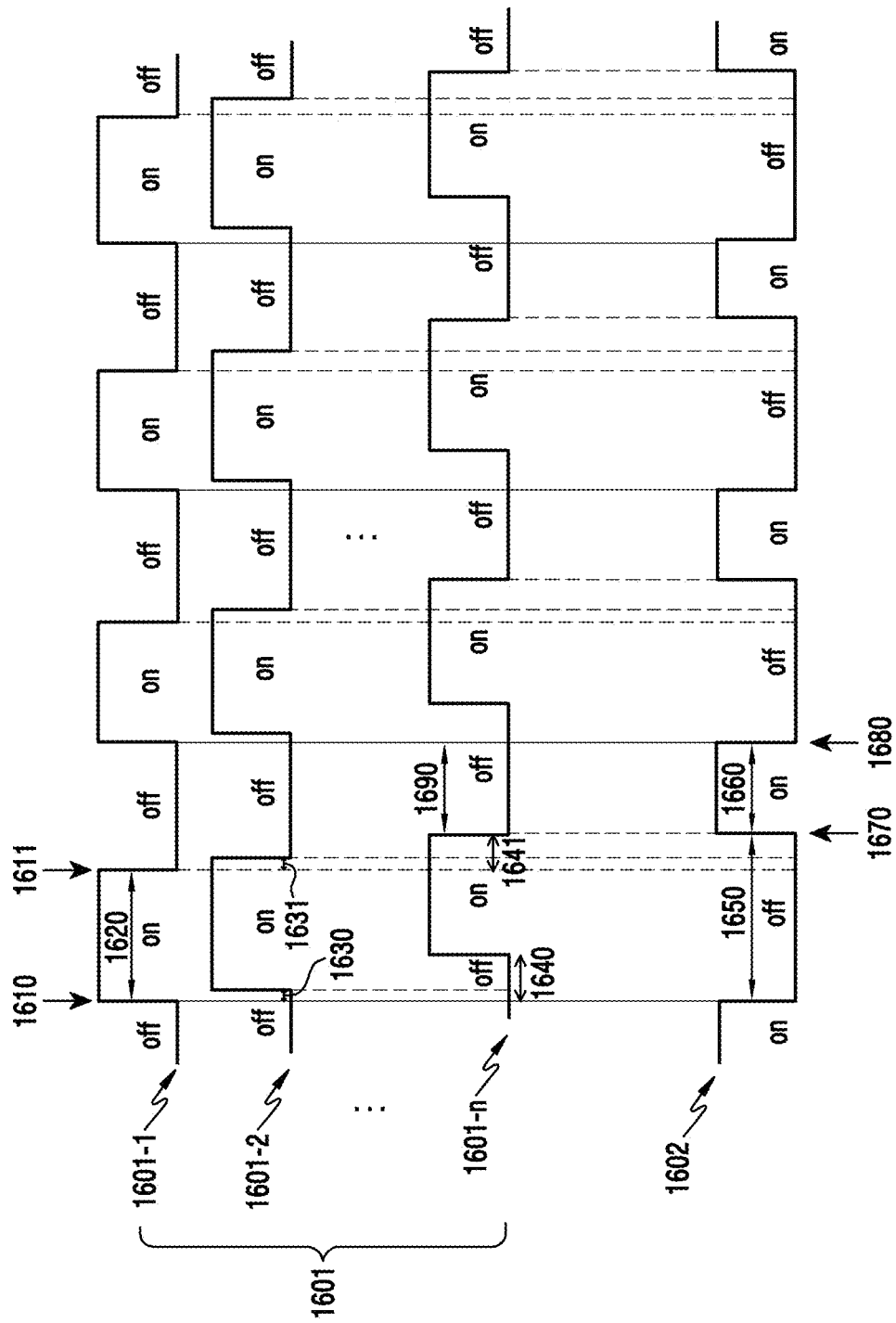
FIG. 16 illustrates an example of an operation of an ambient light sensor included in an electronic device according to various embodiments.

FIG. 16 illustrates another example of a mode of an ambient light sensor included in an electronic device according to various embodiments.

In FIG. 16, the mode of the ambient light sensor 240K may correspond to the second mode.

Referring to FIG. 16, graph 1601 may indicate states of one or more scanning lines included in the display 260. In detail, in response to the display 260 including an n number of scanning lines, graphs 1601-1 to 1601-n may indicate the states of one or more scanning lines affecting the ambient light sensor 240K, respectively. In response to the display 260 being activated (or in response to a power supply being supplied), the panel 262 may display a screen, based on an operation in which one or more scanning lines repeat an activated state (or a turn-on state) and an inactivated state (or a turn-off state). In response to the display 260 being inactivated, the scanning lines may maintain the inactivated state. The one or more scanning lines may each include one or more elements. Horizontal axes of graphs 1601-1 to 1601-n may indicate time. Vertical axes of graphs 1601-1 to 1601-n may indicate whether the one or more scanning lines among the n number of scanning lines included in the panel 262 and affecting the ambient light sensor 240K operate in an active state. Graph 1601-1 may be the first scanning line affecting the ambient light sensor 240K among the n number of scanning lines included in the panel 262. Graph 1601-2 may be the second scanning line affecting the ambient light sensor 240K among the n number of scanning lines included in the panel 262. Graph 1601-n may be the nth scanning line affecting the ambient light sensor 240K among the n number of scanning lines included in the panel 262.

Graph 1602 may indicate an operation state of the ambient light sensor 240K. A horizontal axis of graph 1602 may indicate time, and a vertical axis of graph 1602 may indicate whether the ambient light sensor 240K operates in an active state.

In graph 1601-1, in response to reaching a timing 1610, the first scanning line affecting the ambient light sensor 240K may be converted into an active state.

The first scanning line may operate in the active state during a duration 1620. In response to reaching a timing 1611 (or in response to a lapse of the duration 1620), the first scanning line may operate in an idle state. The first scanning line may repeatedly perform this operation.

In graph 1601-2, in response to a lapse of a duration 1630, the second scanning line affecting the ambient light sensor 240K may be converted into the active state. The duration 1630, which is a duration before the second scanning line is activated after the first scanning line is activated, may be denoted as a delay duration. The second scanning line may be converted into the idle state after a lapse of the delay duration after it reaches a timing 1611 being a timing for converting the first scanning line into the idle state. A time gap of the duration 1630 being the duration before the second scanning line is activated after the first scanning line is activated may correspond to a time gap of a duration 1631 being a duration before the second scanning line is inactivated after the first scanning line is inactivated.

In graph 1601-n, the nth scanning line may be converted into the active state after a lapse of a duration 1640 indicating an integration of an (n−1) number of delay time after it reaches the timing 1610. The nth scanning line may be converted into the idle state after the lapse of the (n−1) number of delay time (i.e., a duration 1641) corresponding to the duration 1640 after it reaches the timing 1611. During a duration 1690 until the first scanning line is converted into the active state after the nth scanning line is converted into the idle state, the n number of scanning lines affecting the ambient light sensor 240K may operate in the idle state.

In graph 1602, while at least one scanning line among the n number of scanning lines operates in the active state, the ambient light sensor 240K may operate in the idle state (or inactive state). For example, the ambient light sensor 240K may operate in the idle state during a duration 1650. In other words, the ambient light sensor 240K may stop receiving light during the duration 1650.

In response to reaching a timing elapsing the duration 1641 from the timing 1611, i.e., reaching a timing 1670, the ambient light sensor 240K may operate in the active state converted from the idle state. The ambient light sensor 240K may synchronize with the panel 262, based on a state signal received from the panel 262 through the signal pin 626 and the signal pin 616. On the basis of the synchronization, the ambient light sensor 240K may convert a state of the ambient light sensor 240K into the active state at a timing at which the nth scanning line is converted into the idle state. The ambient light sensor 240K may operate in the active state during a duration 1660. The ambient light sensor 240K may operate in the idle state in response to reaching a timing 1680. Because the ambient light sensor 240K operates based on a cyclically received state signal, the ambient light sensor 240K may convert into the idle state at the timing 1680 that is a timing at which the first scanning line is converted into the active state. The ambient light sensor 240K may repeatedly perform this operation.

In various embodiments, the duration 1660 being a duration for maintaining the activation state of the ambient light sensor 240K may be included in the duration 1690 being a duration for maintaining the idle state of the n number of scanning lines. That is, the ambient light sensor 240K may measure light around the electronic device 101 within the duration for which an n number of scanning lines are in the idle state.

Figure 17:
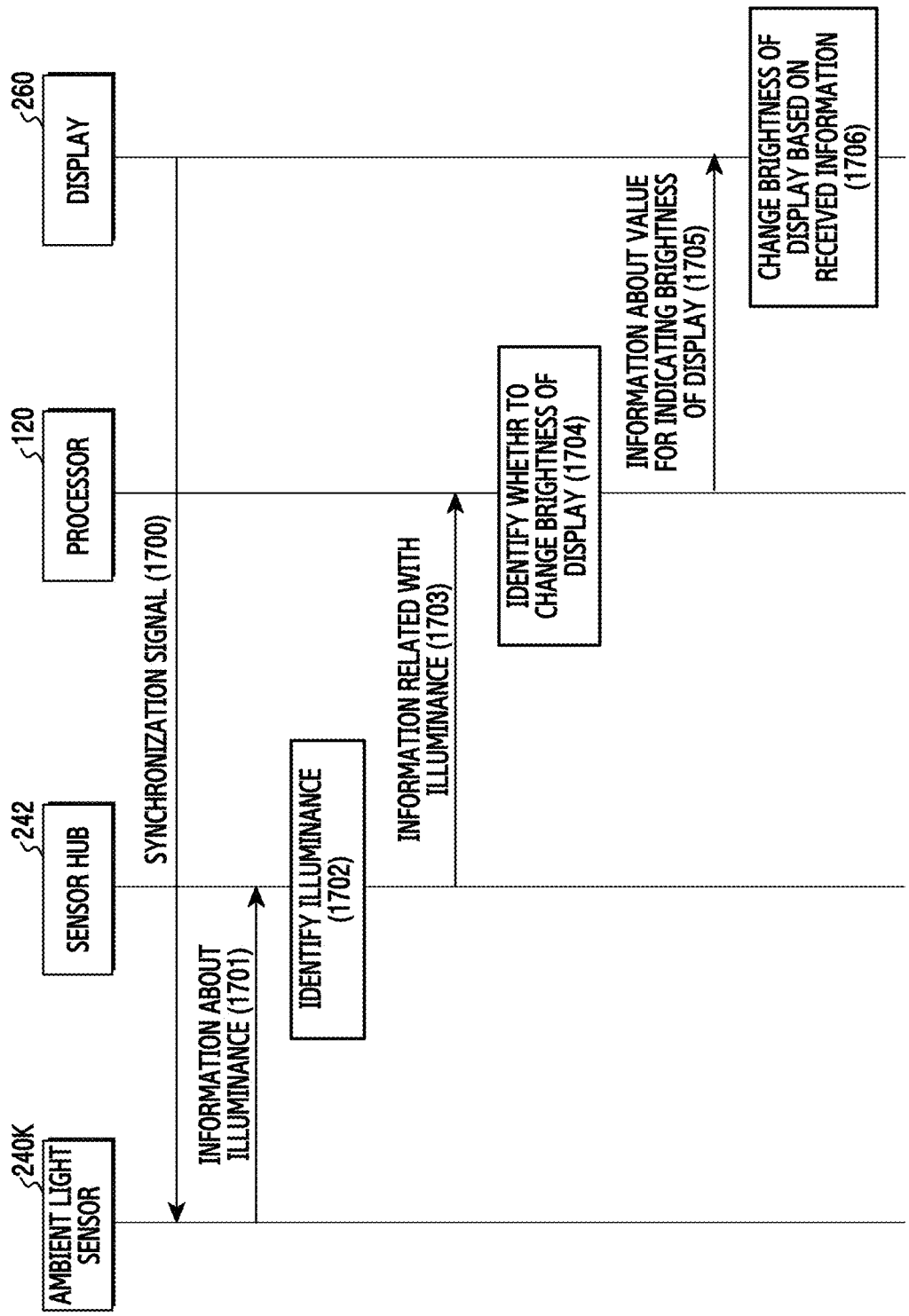
FIG. 17 illustrates an example of a signal flow for controlling a display included in an electronic device according to various embodiments.

FIG. 17 illustrates an example of a signal flow for controlling a display included in an electronic device according to various embodiments.

Referring to FIG. 17, the electronic device 101 may include the ambient light sensor 240K, the sensor hub 242, the processor 120, and the display 260. In operation 1700, the ambient light sensor 240K may receive a state signal from the display 260. The state signal may be transmitted from the signal pin 626 included in the display 260 to the signal pin 616 included in the ambient light sensor 240K. In accordance with various embodiments, the state signal may indicate information related with a state of the panel 262 of the display 260. For example, the state signal may indicate whether it is a state in which a screen displayed in the panel 262 is activated, in a state in which the display 260 is activated (or a state in which a power supply is supplied).

In some embodiments, the state signal may be repeatedly transmitted from the display 260 to the ambient light sensor 240K whenever the panel 262 is activated. For example, the panel 262 may display the screen, based on a process of repeating an activation operation and an inactivation operation. In this embodiment, the display 260 may transmit the state signal to the ambient light sensor 240K every timing at which the panel 262 begins to perform the activation operation in order to display the screen.

In other some embodiments, the state signal may be a process being separate from a process of performing operation 1701 to operation 1706. For example, while the information related with the illuminance is transmitted from the sensor hub 242 to the processor 120 in operation 1703, the state signal may be transmitted from the display 260 to the ambient light sensor 240K.

In operation 1701, the ambient light sensor 240K may provide the information about the illuminance to the sensor hub 242 of FIG. 6. In various embodiments, the ambient light sensor 240K may identify an activation timing of the ambient light sensor 240K, based on the received state signal. The ambient light sensor 240K may receive light (rays) around the electronic device 101, based on the identified activation timing. The ambient light sensor 240K may receive light around the electronic device 101 through the light receiving unit 612. The received light may be analog data. The analog data may be transmitted from the light receiving unit 612 to the ADC 614. In the ADC 614, the analog data may be converted into digital data, and be transmitted to the sensor hub 242.

In operation 1702, the sensor hub 242 may identify the received digital data. On the basis of the identifying, the sensor hub 242 may identify an illuminance of the light.

In operation 1703, the sensor hub 242 may transmit information related with the illuminance identified in operation 1702, to the processor 120 of FIG. 6. The processor 120 may receive the information about the illuminance.

In operation 1704, the processor 120 may identify whether to change a brightness of the display 260, based on the received information about the illuminance. The processor 120 may compare the received information related with the illuminance and a brightness of a screen currently displayed through the panel 262 of the display 260. In response to the information related with the illuminance being higher than the brightness of the screen, the processor 120 may identify to increase the brightness of the screen. In response to the information related with the illuminance being lower than the brightness of the screen, the processor 120 may identify to decrease the brightness of the screen.

In operation 1705, the processor 120 may transmit information related with a value for indicating a brightness of the display 260, to the display 260. The information related with the value for indicating the brightness of the display 260 may include information about a luminance of the display 260. The display 260 may receive the information related with the value for indicating the brightness of the display 260.

In operation 1706, the display 260 may change the brightness of the display 260, based on the received information. The processor 120 may transmit information for indicating the brightness, to the DDI 268 included in the display 260. On the basis of the information, the DDI 268 may control the brightness of the screen displayed through the panel 262 of the display 260.

In various embodiments, a method of the electronic device 101 may include sensing ambient light of the electronic device 101 during a first duration by using the ambient light sensor 240K, in a state in which the display 260 is turned off, identifying the setting of the ambient light sensor 240K, based on at least in part on a characteristic of the ambient light, sensing ambient light of the electronic device 101 during a second duration through the ambient light sensor 140K, based on at least in part on the identified setting of the ambient light sensor 240K, and controlling a function of the display 260 of the electronic device 101, based at least in part on a characteristic of the ambient light sensed during the second duration.

In various embodiments, the electronic device 101 may include the display 260, the ambient light sensor 240K including at least one light receiving unit for sensing ambient light of the electronic device 101, and the processor 120. The processor 120 may activate the light receiving unit of the ambient light sensor 240K during a first duration of time, to sense ambient light of the electronic device 101, and in response to a characteristic of the ambient light satisfying a designated condition, activate the light receiving unit during a part of a second duration of time and inactivate the light receiving unit during another part of the second duration of time, to sense ambient light of the electronic device 101, and control a function of the display 260, based at least in part on a characteristic of the ambient light sensed during the second duration of time.

In various embodiments, a method of the ambient light sensor 240K may include measuring a first ambient light of the electronic device 101, in a state in which at least one or more pixels are turned off, and in response to the first ambient light satisfying a designated condition, measuring a second ambient light of the electronic device at a first cycle of time, and in response to the first ambient light not satisfying the designated condition, measuring the second ambient light at a second cycle of time, based at least on state signals of the at least one or more pixels.

In various embodiments, a method of the electronic device 101 may include sensing ambient light of the electronic device 101 during a first duration by using the ambient light sensor 240K, in a state in which the display 260 is turned off, identifying setting for being used for the ambient light sensor 240K, based on at least in part on a characteristic of the ambient light, sensing ambient light of the electronic device 101 during a second duration through the ambient light sensor 240K, based on at least in part on the identified setting, and controlling a function of the display 260, based at least in part on a characteristic of the ambient light sensed during the second duration.

An electronic device and an operation method thereof according to various embodiments may more improve a function of the ambient light sensor of the electronic device. According to various embodiments, a signal related with the screen displayed through the panel of the display of the electronic device may be transmitted to the ambient light sensor. The ambient light sensor may control an operation of measuring the illuminance, based on the received signal.

According to various embodiments, the panel included in the display of the electronic device may display the screen through repeating an on/off operation. The ambient light sensor may initiate an operation of measuring light at a timing at which the panel is turned off. On the basis of the operation, the ambient light sensor may reduce the influence of the screen displayed through the panel. Through this operation, the accuracy, reliability, etc. of the illuminance measured through the ambient light sensor may be secured.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a display;
    an ambient light sensor disposed beneath the display; and
    at least one processor, operatively connected to the display and the ambient light sensor and configured to:
        control the ambient light sensor to detect ambient light while the display is in a turn-off state;
        identify a setting to be used for controlling the ambient light sensor, based at least in part on a characteristic of ambient light detected while the display is in the turn-off state;
        responsive to the identified setting corresponding to a first configuration and the display being in a turn-on state, control the ambient light sensor to detect ambient light for a first active duration longer than a duration of at least a portion of an activated state of the display and a subsequent inactivated state of the display;
        responsive to the identified setting corresponding to a second configuration and the display being in the turn-on state, control the ambient light sensor to detect ambient light for a second active duration that is equal to or less than a duration of an inactivated state of the display; and
        control a function of the display, based at least in part on the characteristic of ambient light detected while the display is in the turn-on state.

2. The electronic device of claim 1, wherein the at least one processor is configured to, as part of identifying the setting:
    identify a first duration of time as a light measurement time of the ambient light sensor in response to the characteristic satisfying a designated condition, and
    identify a second duration of time as the light measurement time in response to the characteristic not satisfying the designated condition.

3. The electronic device of claim 2, wherein the at least one processor is configured to:
    activate a light receiving unit of the ambient light sensor during the first duration of time;
    activate the light receiving unit during a part of the second duration of time; and
    inactivate the light receiving unit during another part of the second duration of time.

4. The electronic device of claim 1, wherein the at least one processor is configured to:
    acquire a state signal corresponding to a state of the display; and
    detect the ambient light during the second active duration, based at least in part on the state signal.

5. The electronic device of claim 4, wherein the at least one processor is configured to acquire the state signal in response to a pixel among a plurality of pixels of the display satisfying a designated state.

6. The electronic device of claim 5, wherein the display comprises a driving circuit configured to transmit the state signal to the at least one processor in response to the pixel satisfying the designated state.

7. The electronic device of claim 1, wherein the at least one processor is configured to adjust a luminance of a screen outputted through the display according to a brightness of the ambient light, as at least part of controlling the function of the display.

8. The electronic device of claim 1, wherein:
    the display comprises a driving circuit including a first pin for transmitting a state signal corresponding to the activated state and the inactivated state of the display,
    the ambient light sensor comprises a second pin electrically coupled with the first pin for receiving the state signal directly from the driving circuit of the display, and
    the ambient light sensor is configured to control a timing of ambient light detection based at least on the state signal received from the driving circuit of the display.

9. An electronic device comprising:
    a display;
    an ambient light sensor comprising a light receiving unit configured to detect ambient light of the electronic device; and
    at least one processor, operatively connected to the display and the ambient light sensor and configured to:
        identify a setting for controlling the ambient light sensor;
        responsive to the identified setting corresponding to a first configuration, control the ambient light sensor to detect ambient light for a first active duration of time irrespective of a state of the display;
        responsive to the identified setting corresponding to a second configuration, control the ambient light sensor to detect ambient light for a second active duration of time during a turn-off state of the display; and
        control a function of the display, based at least in part on a characteristic of ambient light detected.

10. The electronic device of claim 9, wherein the at least one processor is configured to:
    determine that the display is converted into a turn-on state; and control the ambient light sensor to detect ambient light based on determining that the display is converted into the turn-on state.

11. The electronic device of claim 9, wherein the at least one processor is configured to:
   control the ambient light sensor to detect ambient light during a third active duration of time to detect ambient light, in response to a characteristic of ambient light detected during a first duration of time not satisfying a designated condition; and
   control the function of the display, based at least in part on the characteristic of ambient light detected during the third active duration of time.

12. The electronic device of claim 9, wherein the ambient light sensor is disposed beneath the display.

13. The electronic device of claim 12, wherein the at least one processor is configured to:
   acquire a state signal corresponding to the state of the display; and
   control the ambient light sensor to detect ambient light during the second active duration of time, based at least in part on the state signal.

14. The electronic device of claim 13, wherein the at least one processor is configured to acquire the state signal in response to a pixel among a plurality of pixels of the display satisfying a designated state.

15. The electronic device of claim 14, wherein the display comprises a driving circuit configured to transmit the state signal to the at least one processor in response to the pixel satisfying the designated state.

16. The electronic device of claim 9, wherein:
   the display comprises a driving circuit including a first pin for transmitting a state signal corresponding to an activated state and an inactivated state of the display,
   the ambient light sensor comprises a second pin electrically coupled with the first pin for receiving the state signal directly from the driving circuit of the display, and
   the ambient light sensor is configured to control a timing of ambient light detection based at least on the state signal received from the driving circuit of the display.

17. A method of an electronic device, comprising:
   identifying a setting to be used for controlling an ambient light sensor, based at least in part on a characteristic of ambient light detected while a display is in a turn-off state;
   detecting, in response to the identified setting corresponding to a first configuration and the display being in a turn-on state, ambient light of the electronic device for a first active duration that is longer than a duration of at least a portion of an activated state of the display and a subsequent inactivated state of the display;
   detecting, in response to the identified setting corresponding to a second configuration and the display being in the turn-on state, ambient light of the electronic device for a second active duration that is equal to or less than a duration of the inactivated state of the display; and
   controlling a function of the display, based at least in part on the characteristic of ambient light detected.

18. The method of claim 17, wherein the identifying comprises:
   identifying a first duration of time as a light measurement time of the ambient light sensor in response to the characteristic satisfying a designated condition, and
   identifying a second duration of time as the light measurement time in response to the characteristic not satisfying the designated condition.

19. An electronic device comprising:
   a display;
   an ambient light sensor disposed beneath the display; and
   at least one processor, operatively connected to the display and the ambient light sensor and configured to:
      control the ambient light sensor to detect ambient light while the display is in a turn-off state;
      identify a setting to be used for controlling the ambient light sensor, based at least in part on a characteristic of ambient light detected while the display is in the turn-off state;
      responsive to the identified setting corresponding to a first configuration and the display being in a turn-on state, control the ambient light sensor to detect ambient light for a first active duration longer than a duration of at least a portion of an inactivated state of the display and a portion of a subsequent activated state of the display;
      responsive to the identified setting corresponding to a second configuration and the display being in the turn-on state, control the ambient light sensor to detect ambient light for a second active duration that is equal to or less than a duration of the inactivated state of the display; and
      control a function of the display, based at least in part on the characteristic of ambient light detected while the display is in the turn-on state.

* * * * *